United States Patent
Kumar et al.

(10) Patent No.: US 11,910,363 B2
(45) Date of Patent: Feb. 20, 2024

(54) RESOURCE SHARING DURING COMMUNICATION PAUSE

(71) Applicant: QUALCOMM Incorporated, San Diego, CA (US)

(72) Inventors: Sanjay Kumar, Bharatpur (IN); Bapineedu Chowdary Gummadi, Hyderabad (IN); Balaji Kannan, Hyderabad (IN); Vivek Padi, Bangalore (IN); Arun Ashok Tagare, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 17/364,049

(22) Filed: Jun. 30, 2021

(65) Prior Publication Data

US 2023/0007640 A1    Jan. 5, 2023

(51) Int. Cl.
| | | |
|---|---|---|
| *H04W 76/28* | (2018.01) | |
| *H04W 4/00* | (2018.01) | |
| *H04W 76/19* | (2018.01) | |
| *H04W 56/00* | (2009.01) | |
| *H04W 4/16* | (2009.01) | |
| *H04W 48/18* | (2009.01) | |
| *H04M 3/54* | (2006.01) | |
| *H04W 72/044* | (2023.01) | |
| *H04W 72/56* | (2023.01) | |

(52) U.S. Cl.
CPC ......... *H04W 72/044* (2013.01); *H04W 72/56* (2023.01); *H04W 76/28* (2018.02)

(58) Field of Classification Search
CPC . H04W 76/10; H04W 28/02; H04W 28/0205; H04W 76/15; H04W 36/14; H04W 76/34; H04W 76/28; H04L 43/46; H04M 3/2227; H04M 15/7556
USPC .............................................. 455/450, 552.1
See application file for complete search history.

(56) References Cited

U.S. PATENT DOCUMENTS

| | | | |
|---|---|---|---|
| 9,185,737 B2 * | 11/2015 | Chang | H04W 76/28 |
| 2016/0037329 A1 * | 2/2016 | Chong | G09G 3/3291 |
| | | | 455/422.1 |
| 2016/0381710 A1 * | 12/2016 | Bansal | H04W 72/12 |
| | | | 370/336 |
| 2021/0410107 A1 * | 12/2021 | Park | H04W 76/27 |
| 2022/0303944 A1 * | 9/2022 | Ljung | H04W 68/005 |

* cited by examiner

*Primary Examiner* — Khaled M Kassim
*Assistant Examiner* — Jason A Harley
(74) *Attorney, Agent, or Firm* — Holland & Hart LLP

(57) ABSTRACT

Methods, systems, and devices for wireless communications are described. A user equipment (UE) may establish multiple wireless connections, such as a wireless connection for a first subscriber identity module (SIM) and a wireless connection for a second SIM, that share time-frequency resources. The UE may communicate data packets with another device during a communication session on the wireless connection for the first SIM. The UE may determine to pause the communication session for a duration based on receiving an indication from the other UE or based on a user input to pause communication. The UE may communicate data packets on the wireless connection for the second SIM for at least a portion of the duration using the shared time-frequency resources based on pausing the communication session.

27 Claims, 11 Drawing Sheets

RESOURCE SHARING DURING COMMUNICATION PAUSE

FIELD OF TECHNOLOGY

The following relates to wireless communications, including resource sharing during communication pause.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support resource sharing during communication pause. Generally, the described techniques provide for a user equipment (UE) with multiple subscriber identity modules (SIMs) to allocate shared time-frequency resources based on pausing a communication session. For example, a UE may initiate a voice call on a subscription for a first SIM (e.g., SIM1) with another device during a communication session. In some cases, the UE may use one or more resources, such as time-frequency resources, to transmit data packets to the other device that overlap with resources for a second SIM (e.g., SIM2). In some examples, the UE may determine to pause the communication session with the other device on the subscription for SIM1 and may transmit a pause indication to the other device. In some other examples, the other device may determine to pause the communication session with the UE and may transmit a pause indication to the UE. If the communication session is paused, the UE may reduce a priority for one or more time-frequency resources SIM1 shares with SIM2. The UE may communicate on the subscription for SIM2 for a duration or until receiving a resume message from the other device (e.g., according to a discontinuous reception (DRX) cycle or until the UE determines to resume the call).

A method for wireless communications is described. The method may include establishing a first wireless connection for a first SIM of the UE and a second wireless connection for a second SIM of the UE, the first wireless connection sharing a set of time-frequency resources with the second wireless connection, communicating during a communication session one or more first data packets on the first wireless connection using the set of time-frequency resources, determining to pause, for a duration, the communication session on the first wireless connection using the set of time-frequency resources, and communicating, for at least a portion of the duration, one or more second data packets on the second wireless connection using the set of time-frequency resources based on determining to pause the communication session on the first wireless connection.

An apparatus for wireless communications is described. The apparatus may include a processor, memory coupled with the processor, and instructions stored in the memory. The instructions may be executable by the processor to cause the apparatus to establish a first wireless connection for a first SIM of the UE and a second wireless connection for a second SIM of the UE, the first wireless connection sharing a set of time-frequency resources with the second wireless connection, communicate during a communication session one or more first data packets on the first wireless connection using the set of time-frequency resources, determine to pause, for a duration, the communication session on the first wireless connection using the set of time-frequency resources, and communicate, for at least a portion of the duration, one or more second data packets on the second wireless connection using the set of time-frequency resources based on determining to pause the communication session on the first wireless connection.

Another apparatus for wireless communications is described. The apparatus may include means for establishing a first wireless connection for a first SIM of the UE and a second wireless connection for a second SIM of the UE, the first wireless connection sharing a set of time-frequency resources with the second wireless connection, means for communicating during a communication session one or more first data packets on the first wireless connection using the set of time-frequency resources, means for determining to pause, for a duration, the communication session on the first wireless connection using the set of time-frequency resources, and means for communicating, for at least a portion of the duration, one or more second data packets on the second wireless connection using the set of time-frequency resources based on determining to pause the communication session on the first wireless connection.

A non-transitory computer-readable medium storing code for wireless communications is described. The code may include instructions executable by a processor to establish a first wireless connection for a first SIM of the UE and a second wireless connection for a second SIM of the UE, the first wireless connection sharing a set of time-frequency resources with the second wireless connection, communicate during a communication session one or more first data packets on the first wireless connection using the set of time-frequency resources, determine to pause, for a duration, the communication session on the first wireless connection using the set of time-frequency resources, and communicate, for at least a portion of the duration, one or more second data packets on the second wireless connection using the set of time-frequency resources based on determining to pause the communication session on the first wireless connection.

In some examples of the method, apparatuses, and non-transitory computer-readable medium described herein, determining to pause the communication session on the first wireless connection may include operations, features, means, or instructions for receiving, from a second UE, an indication to pause the communication session, where the first wireless connection may be established with the second UE.

Some examples of the method, apparatuses, and non-transitory computer-readable medium described herein may further include operations, features, means, or instructions for monitoring, during an on duration of a DRX cycle, for a resume message from the second UE and resuming, after the duration, the communication session based on receiving the resume message.

In some examples of the method, apparatuses, and non-transitory computer-readable medium described herein, determining to pause the communication session on the first wireless connection may include operations, features, means, or instructions for transmitting, to a second UE, an indication to pause the communication session, where the first wireless connection may be established with the second UE.

Some examples of the method, apparatuses, and non-transitory computer-readable medium described herein may further include operations, features, means, or instructions for resuming, after the duration, the communication session on the first wireless connection using the set of time-frequency resources.

Some examples of the method, apparatuses, and non-transitory computer-readable medium described herein may further include operations, features, means, or instructions for monitoring, during an on duration of a DRX cycle configured for the UE, for a message from a base station, the message indicating a configuration for the communication on the first wireless connection.

Some examples of the method, apparatuses, and non-transitory computer-readable medium described herein may further include operations, features, means, or instructions for comparing a priority of the one or more second data packets to a threshold, where monitoring for the message from the base station may be based on the priority being below the threshold.

Some examples of the method, apparatuses, and non-transitory computer-readable medium described herein may further include operations, features, means, or instructions for reducing a priority of the set of time-frequency resources for the first SIM based on determining to pause the communication session on the first wireless connection.

Some examples of the method, apparatuses, and non-transitory computer-readable medium described herein may further include operations, features, means, or instructions for resuming, after the duration, the communication session on the first wireless connection and increasing the priority of the set of time-frequency resources for the first SIM based on resuming the communication session.

In some examples of the method, apparatuses, and non-transitory computer-readable medium described herein, communicating the one or more first data packets may include operations, features, means, or instructions for communicating a voice call with a second UE, the voice call including a voice over long term evolution call, a voice over new radio call, or a combination thereof.

In some examples of the method, apparatuses, and non-transitory computer-readable medium described herein, the UE may be a dual-SIM dual-standby (DSDS) device.

A method for wireless communications is described. The method may include establishing a first wireless connection for a first SIM of the UE and a second wireless connection for a second SIM of the UE, the first wireless connection sharing a set of time-frequency resources with the second wireless connection, communicating during a communication session one or more first data packets on the first wireless connection using the set of time-frequency resources, determining to pause, for a duration, the communication session on the first wireless connection using the set of time-frequency resources, and communicating, for at least a portion of the duration, one or more second data packets on the second wireless connection using the set of time-frequency resources based on determining to pause the communication session on the first wireless connection.

An apparatus for wireless communications is described. The apparatus may include a processor, memory coupled with the processor, and instructions stored in the memory. The instructions may be executable by the processor to cause the apparatus to establish a first wireless connection for a first SIM of the UE and a second wireless connection for a second SIM of the UE, the first wireless connection sharing a set of time-frequency resources with the second wireless connection, communicate during a communication session one or more first data packets on the first wireless connection using the set of time-frequency resources, determine to pause, for a duration, the communication session on the first wireless connection using the set of time-frequency resources, and communicate, for at least a portion of the duration, one or more second data packets on the second wireless connection using the set of time-frequency resources based on determining to pause the communication session on the first wireless connection.

Another apparatus for wireless communications is described. The apparatus may include means for establishing a first wireless connection for a first SIM of the UE and a second wireless connection for a second SIM of the UE, the first wireless connection sharing a set of time-frequency resources with the second wireless connection, means for communicating during a communication session one or more first data packets on the first wireless connection using the set of time-frequency resources, means for determining to pause, for a duration, the communication session on the first wireless connection using the set of time-frequency resources, and means for communicating, for at least a portion of the duration, one or more second data packets on the second wireless connection using the set of time-frequency resources based on determining to pause the communication session on the first wireless connection.

A non-transitory computer-readable medium storing code for wireless communications is described. The code may include instructions executable by a processor to establish a first wireless connection for a first SIM of the UE and a second wireless connection for a second SIM of the UE, the first wireless connection sharing a set of time-frequency resources with the second wireless connection, communicate during a communication session one or more first data packets on the first wireless connection using the set of time-frequency resources, determine to pause, for a duration, the communication session on the first wireless connection using the set of time-frequency resources, and communicate, for at least a portion of the duration, one or more second data packets on the second wireless connection using the set of time-frequency resources based on determining to pause the communication session on the first wireless connection.

In some examples of the method, apparatuses, and non-transitory computer-readable medium described herein, determining to pause the communication session on the first wireless connection may include operations, features, means, or instructions for receiving, from a second UE, an indication to pause the communication session, where the first wireless connection may be established with the second UE.

Some examples of the apparatus may include means for monitoring, during an on duration of a DRX cycle, for a resume message from the second UE and means for resuming, after the duration, the communication session based on receiving the resume message.

In some examples of the method, apparatuses, and non-transitory computer-readable medium described herein, determining to pause the communication session on the first wireless connection may include operations, features, means, or instructions for transmitting, to a second UE, an indication to pause the communication session, where the first wireless connection may be established with the second UE.

Some examples of the apparatus may include means for resuming, after the duration, the communication session on the first wireless connection using the set of time-frequency resources.

Some examples of the apparatus may include means for monitoring, during an on duration of a DRX cycle configured for the UE, for a message from a base station, the message indicating a configuration for the communication on the first wireless connection.

Some examples of the apparatus may include means for reducing a priority of the set of time-frequency resources for the first SIM based on determining to pause the communication session on the first wireless connection.

DETAILED DESCRIPTION

Figure 1:
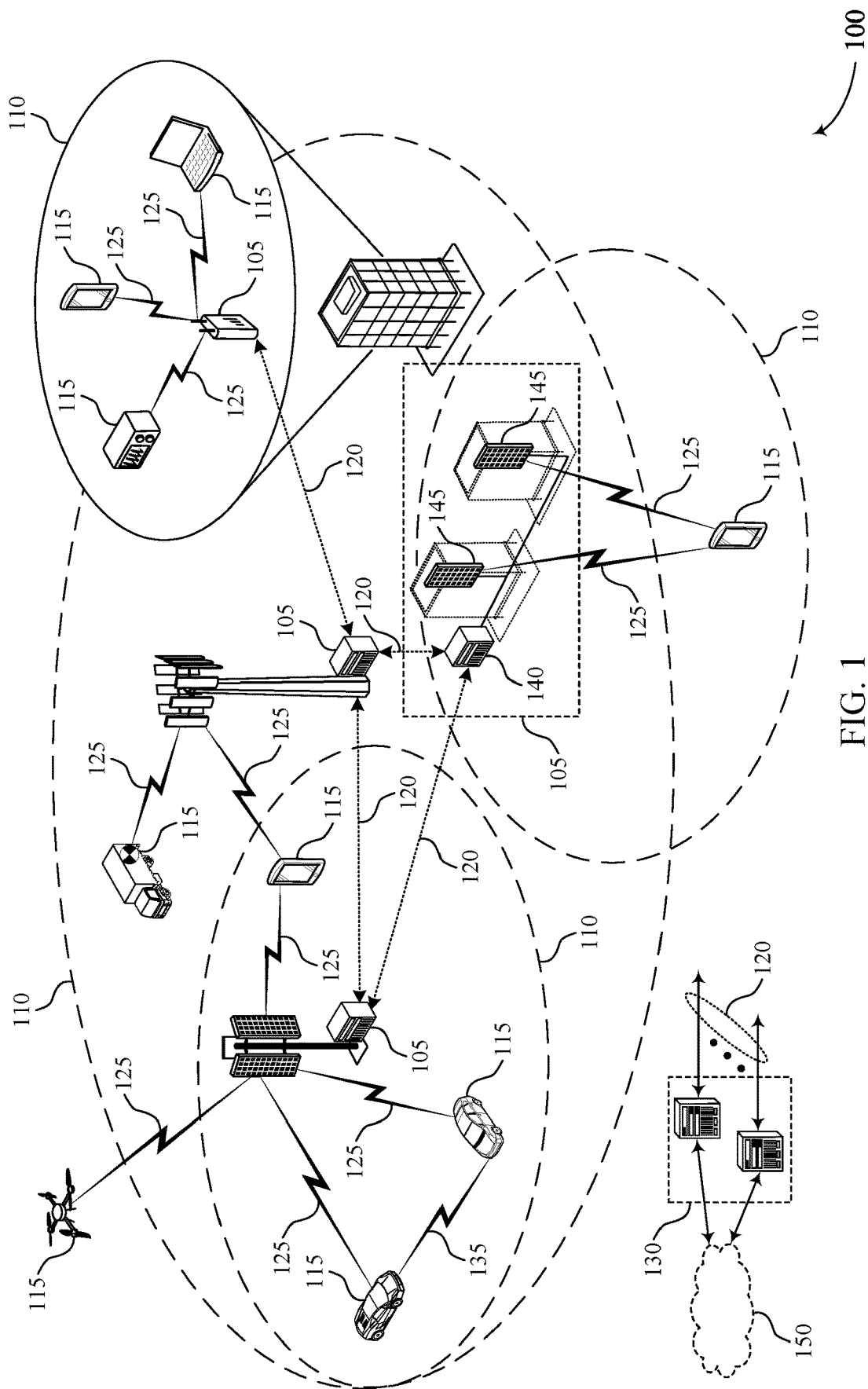
FIGS. 1 through 3 illustrate examples of wireless communications systems that support resource sharing during communication pause in accordance with aspects of the present disclosure.

In some wireless communications systems, a user equipment (UE) may establish a connection with another device, such as another UE, for packet-based communication that occupies a set of configured time-frequency resources for a duration of the connection. As such, for some connections such as voice calls or other connects that satisfy a quality of service (QoS) threshold, the time-frequency resources allocated for the connection may not be released during the connection. For example, the UE may establish a voice call (e.g., voice over long term evolution (VoLTE) or voice over new radio (VoNR)) with the other device. In some examples, the UE may operate according to one or more subscriptions. That is, the UE may be a dual-sim dual-standby (DSDS) device with two subscriptions that may use the same time-frequency resources. In some cases, the UE may pause the packet-based communication for a first of the subscriptions, or the other device may pause the packet-based communication for the first subscription, such as placing the voice call on hold. However, the first subscription may not release the time-frequency resources used for the packet-based communication while paused. Thus, a second subscription may be unable to use the time-frequency resources even though they are not being used for communication on the first subscription.

As described herein, a UE may establish multiple connections for packet-based communication with another device, such as a base station, another UE, or the like. For example, the UE may establish two connections for different subscriber identity modules (SIMS) if the UE is a multiple SIM (MSIM) device, such as a DSDS device. In such examples, the two SIMS of the UE may be configured to communicate on partially or fully overlapping frequency resources or radio frequency bands. As such, the UE may be able to communicate using one SIM at a time. In some cases, the UE may pause the communication of data packets with the other device on one of the SIMS, such as putting a voice call on hold. The UE may receive an indication to pause the communication from the other device (e.g., if the other device puts the call on hold) or may send an indication to pause the communication to the other device (e.g., if the UE puts the call on hold). In some examples, once the UE pauses the communication for the first SIM, the UE may release one or more shared time-frequency resources. For example, an internet protocol multimedia service (IMS) at the UE may send an indication to the lower layers at the UE to reduce the priority of the time-frequency resource for the first SIM, such that the second SIM may use the resource for communication. In some examples, if the UE receives the indication to pause the communication, the UE may release the resources during an off duration of a discontinuous reception (DRX) cycle and may use the resources to monitor for messages indicating for the UE to resume communications on the first SIM during an on duration of the DRX cycle. In some other examples, if the UE sends the indication to pause the communication, the UE may release the resources after sending the message.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to resource sharing during communication pause.

FIG. 1 illustrates an example of a wireless communications system 100 that supports resource sharing during communication pause in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IMS, or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may have one or more SIMS, which may provide for the UE 115 to operate according to multiple subscriptions. For example, the UE 115 may be an MSIM device or a DSDS device and may operate on multiple carrier frequencies. In some cases, the UE 115 may establish wireless connections for packet-based communications using subscriptions for multiple SIMs. The multiple subscriptions or SIMS may be configured to communicate over a same or partially overlapping set of frequency resources (e.g., radio frequency bands, subchannels, or the like) for communications over the wireless connections. In some cases, the UE 115 may be restricted from performing activities, such as communication of data or control signaling, on the subscription for a SIM until the packet-based communication session on a subscription for another SIM ends (e.g., even when a packet-based communication session is paused on the subscription for the SIM). In such cases, the frequency resources for a first SIM or subscription by be held or not releasable for a duration of a connection (e.g., a voice call) even if data is not actively being transmitted or received for periods of time during the connection, which may reduce the performance of the UE 115 due to time-frequency resource allocation inefficiencies.

In some examples, a UE 115 with multiple SIMS may allocate shared time-frequency resources based on pausing a communication session. For example, a UE 115 may initiate a voice call on a subscription for a first SIM (e.g., SIM1) with another device during a communication session. In some cases, the UE may use one or more resources, such as time-frequency resources, to transmit data packets to the other device that overlap with resources for a second SIM (e.g., SIM2). In some examples, the UE 115 may determine to pause the communication session with the other device on the subscription for SIM1 and may transmit a pause indication to the other device. In some other examples, the other device may determine to pause the communication session with the UE 115 and may transmit a pause indication to the UE 115. If the communication session is paused, the UE 115 may reduce a priority for one or more time-frequency resources SIM1 shares with SIM2 to release the resources, which may allow for communication using those resources on a subscription for SIM2. The UE 115 may communicate on the subscription for SIM2 for a duration or until receiving a resume message from the other device (e.g., according to a DRX cycle or until the UE 115 determines to resume the call).

Figure 2:
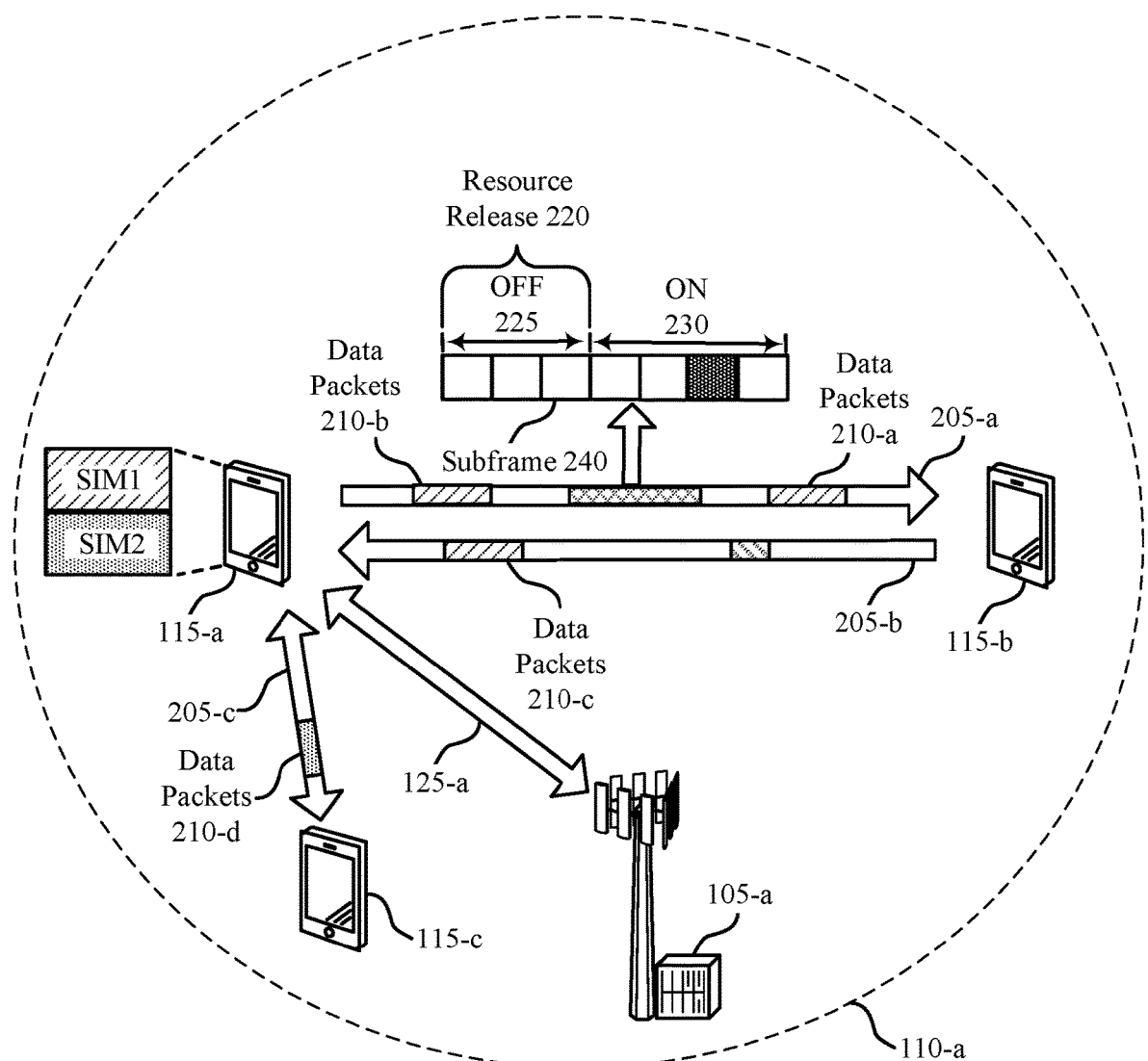

FIG. 2 illustrates an example of a wireless communications system 200 that supports resource sharing during communication pause in accordance with various aspects of the present disclosure. In some cases, wireless communication system 200 may implement aspects of wireless communication system 100 and may include UE 115-*a*, UE 115-*b*, UE 115-*c*, communication link 125-*a*, and base station 105-*a* with coverage area 110-*a*, which may be examples of UEs 115, a communication link 125, and a base station 105 with a coverage area 110 as described with reference to FIG. 1. In some cases, a UE 115 may communicate control signaling, data, or both with a base station via a communication link 125-*a*. Similarly, the UE 115 may communicate control signaling, data, or both with one or more wireless devices, such as additional UEs 115, via a communication link 205. For example, base station 105-*a* may configure UE 115-*a* via communication link 125-*a* to transmit data to UE 115-*b* using one or more data packets 210 via communication link 205-*a*. Additionally or alternatively, UE 115-*b* may transmit data to UE 115-*a* using one or more data packets 210-*c* via communication link 205-*b*. Communication link 205-*a* and communication link 205-*b* may be a sidelink communication link or may involve one or more connections with base station 105-*a*, such as a Uu connection.

In some cases, UE 115-*a* may receive a pause indication 215 from UE 115-*b* for communications using one or more time-frequency resources on a subscription for a SIM, such as a subscription for SIM1. UE 115-*a* may perform a resource release 220 to use the resources to communicate with a wireless device (e.g., UE 115-*c*) on a second subscription for another SIM, such as a subscription for SIM2, during an off duration 225 of a DRX cycle 235.

In some examples, a UE 115-*a* may have one or more SIMs, which may provide for the UE 115-*a* to operate according to multiple subscriptions. For example, UE 115-*a* may be an MSIM device or a DSDS device and may operate on multiple carrier frequencies. An MSIM device may include design features to accommodate multiple SIM cards, which may support one or more SIMs with distinct wireless subscriptions. The MSIM device may include design features to accommodate a variety of SIM designs, such as virtual SIMS (e.g., an embedded SIM (eSIM)). An MSIM device may have the ability to place individual SIMs in standby or active modes. For example, an MSIM device may be a dual SIM single standby (DSSS) device, a dual SIM dual active (DSDA) device or a DSDS device. A DSDS device may be a hybrid implementation of two MSIM technologies including aspects of DSSS technology and aspects of DSDA technology. A DSDS device may incorporate design features such that the device may activate two SIMS using a radio transceiver. In some cases, a DSDS device may switch a SIM from active mode to standby mode if another SIM is engaged in communications. Additionally or alternatively, a DSDS device may switch a SIM from active mode to standby mode if a communication session using a subscription for another SIM is paused.

In some cases, the UE 115-*a*, which may be DSDS device, may establish wireless connections for packet-based communications using subscriptions for multiple SIMS. The subscriptions may share a set of radio frequency resources (e.g., radio frequency bands, radio frequency carriers, radio frequency subchannels, etc.) for communications over the wireless connections. For example, UE 115-*a* may establish a wireless connection on a subscription for SIM1 with UE 115-*b* using communication link 205-*a* and communication link 205-*b*. In some examples, the packet-based communications may involve the UE 115-*a* exchanging data packets 210 (e.g., during a voice call) with another device, such as another UE 115, on a subscription for a first SIM of the multiple SIMS during a communication session. For example, UE 115-*a* may establish the voice call on the subscription for SIM1 with UE 115-*b* and may transmit one or more data packets 210-*a* to UE 115-*b* via communication link 205-*a*. Similarly, UE 115-*b* may establish the voice call on the subscription for SIM1 with UE 115-*a* and may transmit one or more data packets 210-*c* to UE 115-*a* via communication link 205-*b*. In some examples, the UE 115-*a* may hold one or more time-frequency resources on the subscription for the first SIM during the communication session (e.g., a voice call with another device) and may not release the resources until the communication session ends. In some cases, while the communication session on the subscription is active, there may not be activity (e.g., monitoring, data transmission or reception, etc.) running on another subscription, such as a subscription for a second SIM of the multiple SIMs.

In some examples, one or more UEs 115, such as UE 115-*a* and UE 115-*b*, may communicate data packets 210 according to a QoS for each wireless connection. That is, the data packet communication may satisfy a QoS threshold, which may be configured at the UEs 115 by a base station 105, may be predetermined, or may be otherwise configured. For example, UE 115-*a* may initiate a voice call (e.g., VoLTE or VoNR), a video call, V2V or V2X communication (e.g., if UE 115-*a* is a vehicle), or the like that satisfies the QoS threshold with UE 115-*b* using one of two or more subscriptions. In some other examples, UE 115-*b* may initiate the communications with UE 115-*a*.

In some examples, the UE 115 may implement an IMS module to manage communications on each subscription for multiple SIMS. For example, UE 115-*a* may implement an IMS module to manage communications with UE 115-*b* for SIM1 and communications with UE 115-*c* for SIM2. The IMS module may manage and deliver multimedia services to the UE 115, including voice call services over a packet-switched network. In some examples, the IMS module may adjust a priority for one or more time-frequency resources for communications on subscriptions for the SIMS. That is, the IMS module may increase or decrease a priority, such as a Transmission Resource Management (TRM) priority, for one or more resources the UE 115 may use to transmit data packets 210 to another device. For example, to initiate a communication session with another device using a subscription for SIM1 (e.g., to initiate or receive initiation of a voice call, such as a VoLTE call), the IMS module may increase the TRM priority of one or more resources for SIM1. In some cases, the TRM priority may relate to the management of transmission resources in various networking modes, such as a mobility management mode (MMode), connected management (CM) mode, or the like. The IMS module may send an indication of the updated priority for the resources to one or more lower layers, which may be managed by an RRC module. For example, the RRC module may manage signaling for a NAS layer, may perform mobility management operations, or the like based on the priority of the resources for SIM1. In some cases, once the IMS module initiates the communication session, the IMS module may hold the radio frequency resources with a relatively high priority until the communications session ends.

Figure 3:
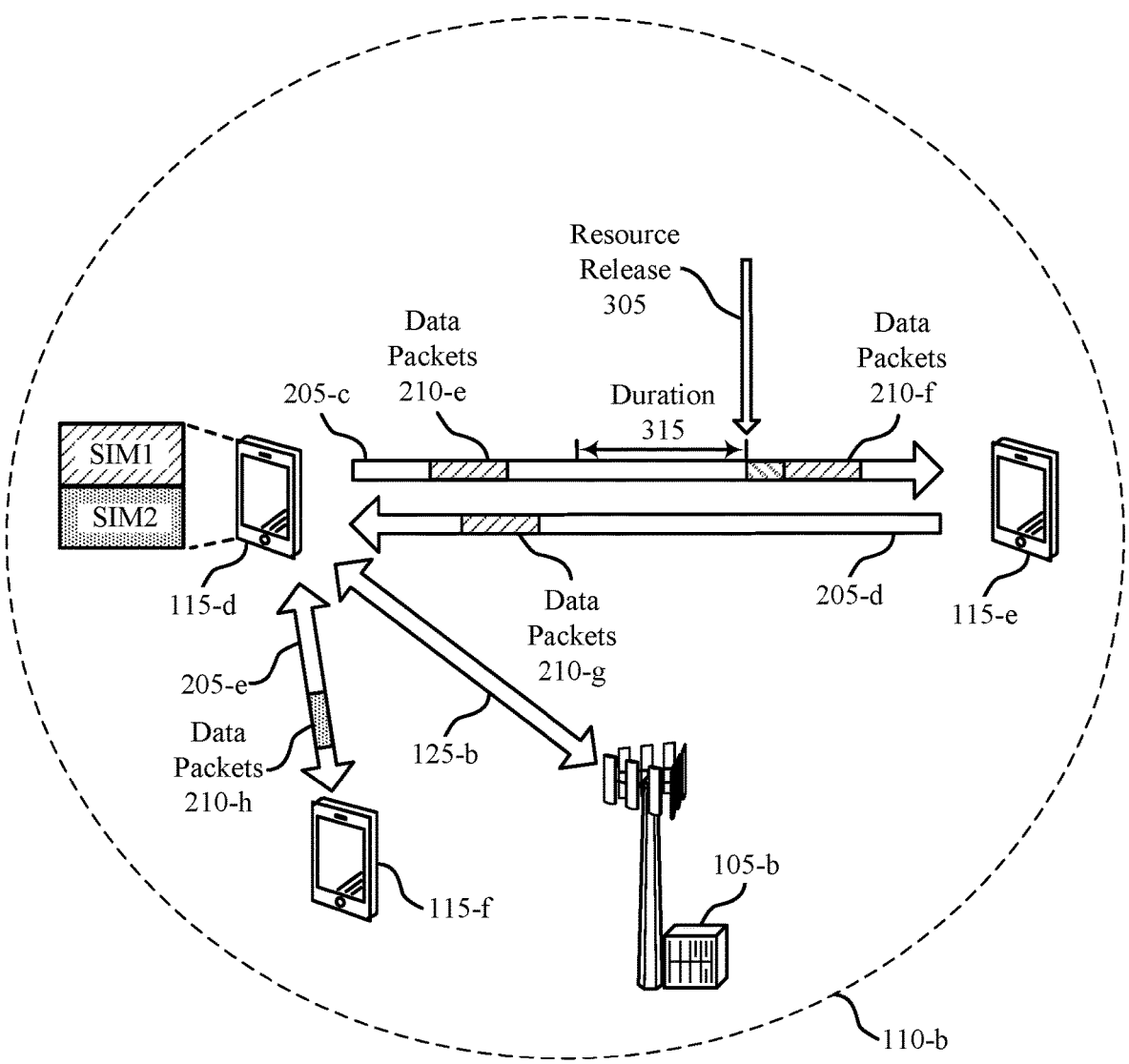

In some cases, a UE 115 may pause a packet-based communication session on the subscription for SIM1, which may involve transmitting an indication to another UE 115 to pause the transmission of data packets 210, which is described in further detail with respect to FIG. 3. In some other cases, the UE 115 may determine to pause transmission of data packets 210 based on the other UE 115 pausing the packet-based communication session. For example, UE 115-*a* may receive a pause indication 215 from UE 115-*b* to pause the packet-based communication session on the subscription for SIM1. In some cases, UE 115-*b* may transmit a pause indication 215 to UE 115-*a* to pause transmission of data packets 210 after data packets 210-*a* have been received. In some examples, if UE 115-*b* sends a pause indication 215 to UE 115-a to pause communications on the subscription for SIM1, a user of UE 115-a may initiate or receive communications on a subscription for SIM2 (e.g., a voice call). If communications on the subscription for SIM2 are established successfully, UE 115-a may release the wireless connection on the subscription for SIM1 (e.g., subsequent to establishing the communications on the subscription for SIM2).

In some cases, the UE 115 may not release time-frequency resources on a subscription for a first SIM that are shared with the subscription for a second SIM while a data packet exchange (e.g., a voice call) on the subscription for the first SIM is paused, which may prevent the UE 115 from using the resources for activity on the subscription for the second SIM. For example, in a DSDS scenario, if a subscription for SIM1 holds one or more radio frequency resources for a voice call, such as a VoLTE call, then the UE 115 may not perform activity on another subscription (e.g., a subscription for SIM2), such as a data communication, measurements, cell searches, or the like. Additionally or alternatively, the subscription for SIM2 may trigger an out of service (OOS) or radio link failure (RLF) after a duration of inactivity (e.g., 5 seconds, 10 seconds, or any other duration). For example, if a voice call is initiated on one subscription, and the voice call is placed on hold for a duration (e.g., more than 5 seconds), an OOS or RLF may be triggered on a second subscription. In some cases, if the UE 115 may not perform activities, such receiving paging messages, on the subscription for SIM2 until the packet-based communication session on the subscription for SIM1 ends (e.g., even when a packet-based communication session is paused on the subscription for SIM1), the performance of the UE 115 may be reduced due to time-frequency resource allocation inefficiencies.

In some cases, to improve resource allocation, a UE 115 with multiple SIMs may allocate shared time-frequency resources based on pausing a communication session. For example, UE 115-a may initiate a voice call with UE 115-b, or UE 115-b may initiate a voice call with UE 115-a during a communication session. The voice call may be on a subscription for SIM1. UE 115-a may transmit data packets 210-a to UE 115-b, and UE 115-b may transmit data packets 210-c to UE 115-a during an initial data exchange in the communication session. In some cases, UE 115-a may use one or more resources, such as time-frequency resources or radio frequency resources, to transmit data packets 210-a that overlap with resources for SIM2 (e.g., if UE 115-a is a DSDS device).

In some examples, UE 115-b may determine to pause the communication session with UE 115-a on the subscription for SIM1. For example, a user operating UE 115-b may place a voice call, such as a VoLTE or VoNR call, on hold. UE 115-b may transmit a pause indication 215 to UE 115-a, which may indicate to UE 115-a that the communication session is paused. In some other examples, UE 115-a may otherwise determine the communication session is paused (e.g., based on a timer expiring, not receiving a response from UE 115-b, a feedback message, or by any other means). In some cases (e.g., in a DSDS scenario), an IMS module at UE 115-a may determine a communication state, such as a pause state or a resume state. For example, the IMS module may receive the pause indication 215 for a voice call with UE 115-b, which may indicate the voice call is put on hold on a subscription for SIM1. Thus, the IMS module may know a communication state, or a call state, for the communication session is set to a value of HOLD.

If the communication session is paused (e.g., the call state is on HOLD), the IMS module may send an indication to reduce a priority for one or more time-frequency or radio frequency resources SIM1 shares with SIM2 to lower layers at UE 115-a. In some examples, the lower layers may include a NAS layer or other lower layer and may depend on a mode of UE 115-a (e.g., a mobility management (MM) mode, a CM mode, or the like). Once the IMS module reduces the priority of the resources, another subscription (e.g., a subscription for SIM2) may use the radio frequency resources to perform one or more activities. For example, UE 115-a may transmit one or more data packets 210-d to UE 115-c on a subscription for SIM2 using the one or more resources, which may prevent UE 115-a from triggering an OOS or RLF on the subscription for SIM2 if the communication session is paused for a duration (e.g., more than 5 seconds, more than 10 seconds, or more than another predetermined or configured amount of time).

In some examples, UE 115-a may perform a resource release 220 when the IMS module reduces the priority of the shared resources for communication on a subscription for SIM1. The IMS module may adjust the priority according to an off duration 225 and an on duration 230 of a DRX cycle 235 at UE 115-a. In some cases, a UE 115 may monitor for transmissions according to a DRX cycle 235. For example, UE 115-a may monitor for transmissions from UE 115-b according to a DRX cycle 235. Each DRX cycle 235 may have an on duration 230 during which UE 115 is awake and actively monitoring one or more communication links (e.g., communication link 125-a, communication link 205-b, or both) and an off duration 225 in which UE 115 is in a reduced power mode, such as a sleep mode, to reduce power consumption. Each DRX on duration 230 may include a number of subframes 240 for receiving messages (e.g., resume message 245). In some examples, the DRX cycle 235 may be an example of a connected mode-DRX cycle (C-DRX) in which UE 115-a is in an RRC connected state. Base station 105-a may transmit control signaling via communication link 125-a to configure UE 115-a with one or more parameters for an initial DRX cycle 235, such as a periodicity of the DRX cycle 235, a length of on duration 230, or the like. In some cases, UE 115-a may receive one or more signals from base station 105-a during an on duration 230 of a DRX cycle 235. The signals may configure UE 115-a with scheduling information, updated the DRX cycle 235, or may include additional configuration information.

In some cases, the IMS module of UE 115-a may time the resource release 220 (e.g., reduce the priority of the resources for SIM1) such that the resources are available for communications on a subscription for SIM2 during an off duration 225 of the DRX cycle 235. The UE 115-a may use the resources to receive a resume message 245 from UE 115-b. For example, UE 115-a may monitor for an indication to resume communications on the subscription for SIM1, such as a resume message 245 from UE 115-b, using the released resources. Thus, the IMS module may increase the priority of the resources for SIM1 (e.g., after reducing the priority of the resources during the resource release 220) such that the resources are available for monitoring for the resume message 245 on the subscription for SIM1. That is, if UE 115-b pauses a communication session (e.g., places a voice call on hold), UE 115-a may perform the resource release 220 during the off duration 225 but not during the on duration 230 to ensure UE 115-a receives any resume message 245 from UE 115-b.

In some cases, once UE 115-a receives the pause indication 215 from UE 115-b and performs the resource release 220 prior to the off duration 225 (e.g., at the end of a previous on duration 230), UE 115-a may use the released resources to communicate with another device on a subscription for SIM2 during the off duration 225 of the DRX cycle. In some cases, the communication may include UE 115-a transmitting or receiving data packets 210-d from UE 115-c via communication link 205-c using the subscription for SIM2. For example, if a voice call on a subscription for SIM1 with UE 115-b is put on hold by UE 115-b, UE 115-a may allocate one or more time-frequency resources shared between SIM1 and SIM2 to communicate on a subscription for SIM2 during the off duration 225. UE 115-a may initiate another voice call (e.g., VoLTE, VoNR, or the like) with UE 115-c or may initiate any other type of packet-based communication that satisfies the QoS threshold. Once the off duration 225 of the DRX cycle 235 ends (e.g., during an on duration 230 of the DRX cycle 235), UE 115-a may use the shared time-frequency resources to monitor for the resume message 245. That is, UE 115-a may discontinue any communications on the subscription for SIM2 to monitor for the resume message 245 to resume the communications on the subscription for SIM1.

In some examples, UE 115-b may transmit the call resume message 245 to UE 115-a. In some other examples, base station 105-a may indicate to UE 115-a to resume the communication session on the subscription for SIM1. After receiving the resume message 245 or any other indication to resume the communication session on the subscription for SIM1 from base station 105-a, the IMS module at UE 115-a may update a communication status for the subscription for SIM1 (e.g., a call may enter an UNHOLD state). The IMS module may increase the priority of the shared time-frequency resources to continue the communications on the subscription for SIM1, such as to continue a voice call. For example, UE 115-a may transmit data packets 210-b to UE 115-b after receiving the resume message 245.

In some examples, by performing the resource release 220, UE 115-a may improve device performance by improving resource allocation (e.g., using time-frequency resources that may otherwise be idle when the communication is paused). In some examples, a UE 115 may perform the resource release 220 based on supporting one or more modes, such as an NR mode, an Evolved-Universal Mobile Telecommunications System (UMTS) Terrestrial Radio Access Network (E-UTRAN) New Radio-Dual Connectivity (ENDC) mode, an LTE mode, a Wideband-CDMA (W-CDMA) mode, a global system for mobile communications (GSM) mode, or any other UE mode.

FIG. 3 illustrates an example of a wireless communications system 300 that supports resource sharing during communication pause in accordance with various aspects of the present disclosure. In some cases, wireless communication system 300 may implement aspects of wireless communication system 100 and wireless communications system 200. Wireless communications system 300 may include UE 115-d, UE 115-e, UE 115-f, communication link 125-b, and base station 105-b with coverage area 110-b, which may be examples of UEs 115, a communication link 125, and a base station 105 with a coverage area 110 as described with reference to FIG. 1. In some cases, a UE 115 may communicate control signaling, data, or both with a base station via a communication link 125. Similarly, the UE 115 may communicate control signaling, data, or both with one or more wireless devices, such as additional UEs 115, via a communication link 205. For example, base station 105-b may configure UE 115-d via communication link 125-b to transmit data to UE 115-e using one or more data packets 210 via communication link 205-c. Additionally or alternatively, UE 115-e may transmit data to UE 115-d using one or more data packets 210-g via communication link 205-d. In some cases, UE 115-a may determine to pause communications on first subscription for a SIM, such as a subscription for SIM1, with UE 115-e and may perform a resource release 305 to use shared resources to communicate with a wireless device (e.g., UE 115-f) on a second subscription for another SIM, such as a subscription for SIM2.

In some cases, as discussed with reference to FIG. 2, a UE 115 may have one or more SIMs, which may provide for the UE 115 to operate according to multiple subscriptions. For example, UE 115-d may be an MSIM device or a DSDS device that may establish wireless connections for packet-based communications using subscriptions for multiple SIMS, such as SIM1 and SIM2. The subscriptions may share a set of time-frequency resources or radio frequency resources for communications over the wireless connections. For example, UE 115-d may establish a wireless connection on a subscription for SIM1 with UE 115-e using communication link 205-c and communication link 205-d. The wireless connection on the subscription for SIM1 may share time frequency resources with a wireless connection on a subscription for SIM2 between UE 115-d and UE 115-f (e.g., on communication link 205-e). In some examples, UE 115-d and UE 115-e may exchange data packets 210 on the subscription for SIM1 during a communication session. For example, UE 115-d may establish the voice call on the subscription for SIM1 with UE 115-e and may transmit one or more data packets 210-f to UE 115-e via communication link 205-c. Similarly, UE 115-e may establish the voice call on the subscription for SIM1 with UE 115-d and may transmit one or more data packets 210-g to UE 115-d via communication link 205-d.

In some examples, a UE 115 may pause a packet-based communication session on the subscription for SIM1, which may involve transmitting an indication to another UE 115 to pause transmission of data packets 210. For example, UE 115-d may determine to pause a communication session on the subscription for SIM1 (e.g., a user may decide to place a voice call on hold). UE 115-d may transmit a pause indication 310 from UE 115-b to pause the packet-based communication session on the subscription for SIM1. In some cases, UE 115-d may transmit a pause indication 310 to UE 115-e to pause transmission of data packets 210 after data packets 210-f have been received. UE 115-d may wait for a duration 315 before determining to resume the communication on the subscription for SIM1. In some cases, the UE 115 may not release time-frequency resources on a subscription for a first SIM that are shared with the subscription for a second SIM while a data packet exchange (e.g., a voice call) on the subscription for the first SIM is paused, which may prevent the UE 115 from using the resources for activity on the subscription for the second SIM.

In some examples, if UE 115-d sends a pause indication 215 to UE 115-e to pause communications on the subscription for SIM1, a user of UE 115-d may initiate or receive communications on a subscription for SIM2 (e.g., a voice call). If communications on the subscription for SIM2 are established successfully, UE 115-d may wait for a duration and then locally release the wireless connection on the subscription for SIM1 (e.g., UE 115-d may place a call on SIM1 on hold for a limited time after which UE 115-d may release one or more resources used for the call locally).

In some cases, to improve resource allocation, a UE 115 with multiple SIMs may allocate shared time-frequency resources based on pausing a communication session. For example, UE 115-*d* may initiate a voice call with UE 115-*e*, or UE 115-*e* may initiate a voice call with UE 115-*d* during a communication session. The voice call may be on a subscription, such as an operator, for SIM1. UE 115-*d* may transmit data packets 210-*f* to UE 115-*e*, and UE 115-*e* may transmit data packets 210-*g* to UE 115-*d* during an initial data exchange in the communication session. In some cases, UE 115-*d* may use one or more resources, such as time-frequency resources or radio frequency resources, to transmit data packets 210-*d* that overlap with resources for SIM2 (e.g., if UE 115-*d* is a DSDS device).

In some examples, UE 115-*d* may determine to pause the communication session with UE 115-*e* on the subscription for SIM1. For example, a user operating UE 115-*d* may place a voice call, such as a VoLTE or VoNR call, on hold. UE 115-*d* may transmit a pause indication 310 to UE 115-*e*, which may indicate to UE 115-*d* that the communication session is paused. In some other examples, UE 115-*e* may otherwise determine the communication session is paused (e.g., based on a timer expiring, not receiving a response from UE 115-*d*, a feedback message, or by any other means). In some cases (e.g., as described with reference to FIG. 2), an IMS module at UE 115-*d* may determine a communication state, such as a pause state or a resume state. For example, the IMS module may determine a user has paused communication for a voice call with UE 115-*e*, which may indicate the voice call is put on hold on a subscription for SIM1. Thus, the IMS module may know a communication state, or call state, for the communication session is set to a value of HOLD.

Once the communication session is paused, UE 115-*d* may transmit the pause indication 310 to UE 115-*e* and may perform a resource release 305. During the resource release 305, the IMS module may reduce the priority of the resources on the subscription for SIM1. In some examples, UE 115-*d* may use the released resources to communicate with another wireless device, such as UE 115-*f*, on a subscription for SIM2 during a duration 315 that the communication is paused. UE 115-*d* may transmit or receive data packets 210-*h* from UE 115-*f* on the subscription for SIM2 after pausing the communication with UE 115-*e*. For example, if UE 115-*d* places a voice call with UE 115-*e* on the subscription for SIM1 on hold and performs the resource release 305, then UE 115-*d* may use the time-frequency resources for another voice call, or some other communication activity, on the subscription for SIM2 after the resource release 305. The subscription for SIM2 may use the resources (e.g., an radio frequency chain of resource) until UE 115-*d* resumes the voice call with UE 115-*e* (e.g., a user decides to resume the call).

In some examples, UE 115-*d* may continue to use the resources to monitor for signaling from base station 105-*b* via communication link 125-*b*. For example, base station 105-*b* may configure UE 115-*d* with a DRX cycle, which may have an on duration and an off duration as described with reference to FIG. 2. UE 115-*d* may monitor for configuration messages, such as a DRX reconfiguration, scheduling information, or the like during the on-duration of a DRX cycle using the resources provided the priority of the communications on the subscription for SIM2 is relatively low (e.g., below a threshold priority value).

In some cases, once UE 115-*d* resumes the call, after a duration 315, the IMS module may update the communication state (e.g., to an UNHOLD value). The IMS module may increase the priority of the released resources to continue the communication session on the subscription for SIM1 (e.g., to continue a voice call). For example, UE 115-*d* may transmit data packets 210-*e* once the communication is resumed on the subscription for SIM1. In some examples, by performing the resource release 305, UE 115-*d* may improve device performance by improving resource allocation (e.g., using time-frequency resources that may otherwise be idle when the communication is paused).

Figure 4:
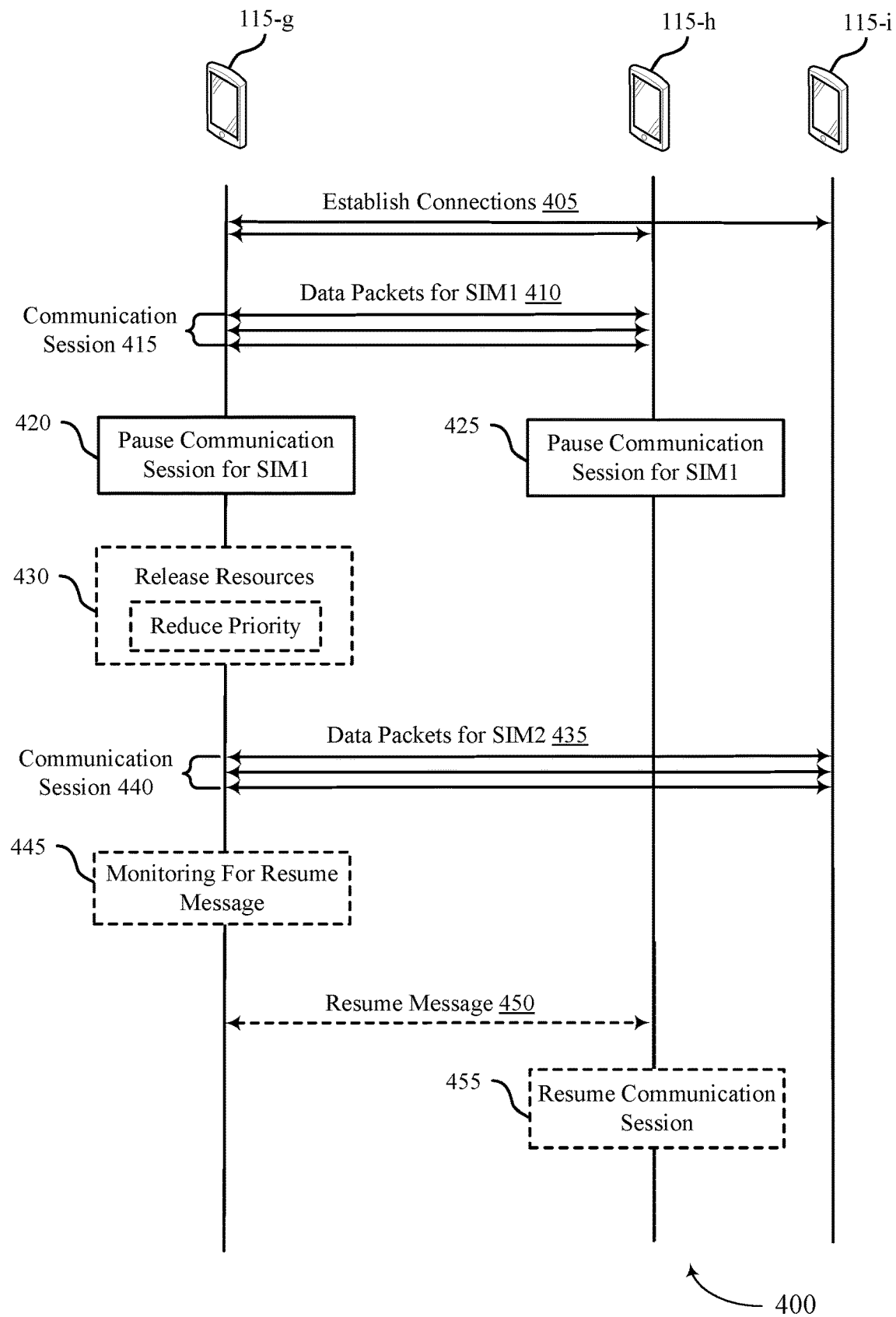
FIG. 4 illustrates an example of a process flow that supports resource sharing during communication pause in accordance with aspects of the present disclosure.

FIG. 4 illustrates an example of a process flow 400 that supports resource sharing during communication pause in accordance with aspects of the present disclosure. In some examples, process flow 400 may implement aspects of wireless communications system 100 through wireless communications system 300. The process flow 400 may illustrate an example of UE 115-*g* releasing resources during a communication pause on a subscription for a first SIM (e.g., SIM1) to use for communication on a subscription for a second SIM (e.g., SIM2) during an off duration of a DRX cycle or throughout the pause duration. Alternative examples of the following may be implemented, where some processes are performed in a different order than described or are not performed. In some cases, processes may include additional features not mentioned below, or further processes may be added.

In some cases, UE 115-*g* may be an example of an MSIM device or a DSDS device and may operate on multiple carrier frequencies. UE 115-*g* may initiate a voice call (e.g., VoLTE or VoNR), a video call, V2V or V2X communication (e.g., if UE 115-*g* is a vehicle), or the like. In some examples, UE 115-*g* may communicate control signaling, data, or both with UEs 115-*h* and 115-*i*.

At 405, UE 115-*g* may establish wireless connections for multiple subscriptions (e.g., for SIM1 and SIM2) of UE 115-*g*. For example, UE 115-*g* may establish a connection with UE 115-*h* using a subscription for SIM1. Similarly, UE 115-*g* may establish a connection with UE 115-*i* using a subscription for SIM2. In some cases, the wireless connections may share a set of time-frequency resources.

At 410, UE 115-*g* may communicate one or more first data packets with UE 115-*h* during a communication session 415 using a subscription for SIM1. The wireless connection may use the shared set of time-frequency resources. For example, UE 115-*g* may exchange data packets with UE 115-*h* on a subscription for SIM1 using a set of time-frequency resources shared with a subscription for SIM2. In some cases, a communication session 415 may include a voice call between UEs 115. In some cases, the voice call may be a VoLTE call, a VoNR call, or the like. For example, during a communication session 415, UE 115-*g* may exchange data packets with UE 115-*h* during a VoLTE call, a VoNR call, or both.

At 420 and 425, a UE 115 (e.g., UE 115-*g* or UE 115-*h*) may determine to pause, for a duration, the communication session 415 on the first wireless connection using the set of shared time-frequency resources. A UE 115 (e.g., UE 115-*g* or UE 115-*h*) may pause the communication session 415 for an off duration of a DRX cycle. For example, the UE 115 may transmit or receive a pause command in an on duration of the DRX cycle. The pause command may indicate for the UE 115 to pause the communication session for the off duration of the DRX cycle. In some examples, a base station may configure the DRX cycle via control signaling (e.g., RRC control signaling, downlink control information (DCI) signaling, a MAC-CE, or the like) at UE 115-*g*. In some cases, UE 115-*h* may determine to pause the communication session 415 on the wireless connection by transmitting an indication to pause the communication session to UE 115-g. In some cases, UE 115-h may determine to pause the communication session after receiving an indication to pause the communication session from UE 115-g.

At 430, UE 115-g may reduce a priority of the set of time-frequency resources for the first subscription for SIM1 based on determining to pause the communication session 415 on the first wireless connection. For example, UE 115-g may release shared time-frequency resources so that a second subscription may use the resources.

At 435, UE 115-g may communicate (e.g., for at least a portion of the DRX off duration) one or more second data packets on the second wireless connection using the set of shared time-frequency resources based on determining to pause the communication session 415 on the first wireless connection. For example, UE 115-g may exchange data packets with the UE 115-i on a subscription for SIM2 during a communication session 440.

At 445, UE 115-g may monitor, during an on duration of the DRX cycle, for a resume message from UE 115-h on a subscription for SIM1. Additionally or alternatively, UE 115-g may monitor, during an on duration of a DRX cycle configured for UE 115-g, for a message from a base station. The message from a base station may indicate a configuration for the communication session 415 on the first wireless connection. Additionally or alternatively, UE 115-g may compare a priority of the one or more second data packets to a threshold, where monitoring for the message from the base station may be based on the priority being below the threshold. In some examples, the threshold may be configured by the base station or may be preconfigured or otherwise determined by UE 115-g.

At 445, a UE 115 may transmit a resume message. For example, UE 115-h may transmit a resume message to UE 115-g on a subscription for SIM1. In some other examples, UE 115-g may transmit a resume message to UE 115-h.

At 450, a UE 115-h may resume, after the duration, the communication session 415 on the first wireless connection. UE 115-g may increase the priority of the set of shared time-frequency resources for the first subscription for SIM1 based at least in part on resuming the communication session.

Figure 5:
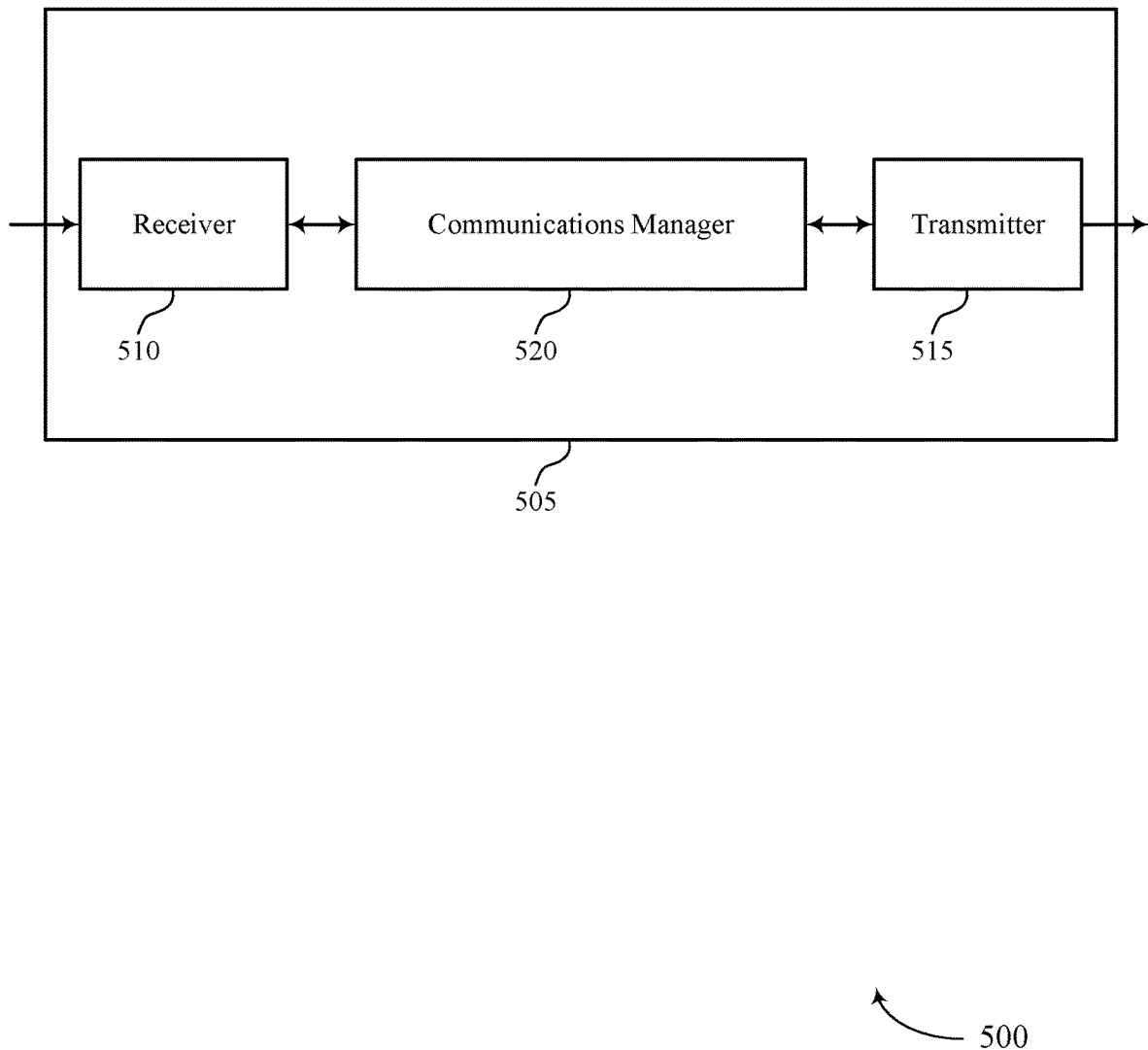
FIGS. 5 and 6 show block diagrams of devices that support resource sharing during communication pause in accordance with aspects of the present disclosure.

FIG. 5 shows a block diagram 500 of a device 505 that supports resource sharing during communication pause in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource sharing during communication pause). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource sharing during communication pause). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of resource sharing during communication pause as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications in accordance with examples as disclosed herein. For example, the communications manager 520 may be configured as or otherwise support a means for establishing a first wireless connection for a first subscriber identity module of the UE and a second wireless connection for a second subscriber identity module of the UE, the first wireless connection sharing a set of time-frequency resources with the second wireless connection. The communications manager 520 may be configured as or otherwise support a means for communicating during a communication session one or more first data packets on the first wireless connection using the set of time-frequency resources. The communications manager 520 may be configured as or otherwise support a means for determining to pause, for a duration, the communication session on the first wireless connection using the set of time-frequency resources. The communications manager 520 may be configured as or otherwise support a means for communicating, for at least a portion of the duration, one or more second data packets on the second wireless connection using the set of time-frequency resources based on determining to pause the communication session on the first wireless connection.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for a UE 115 to release one or more resources during a communication pause on a subscription for a first SIM (e.g., SIM1) to use for communication on a subscription for a second SIM (e.g., SIM2) during an off duration of a DRX cycle or throughout the pause duration, which may reduce processing, reduced power consumption, result in more efficient utilization of communication resources, and more.

Figure 6:
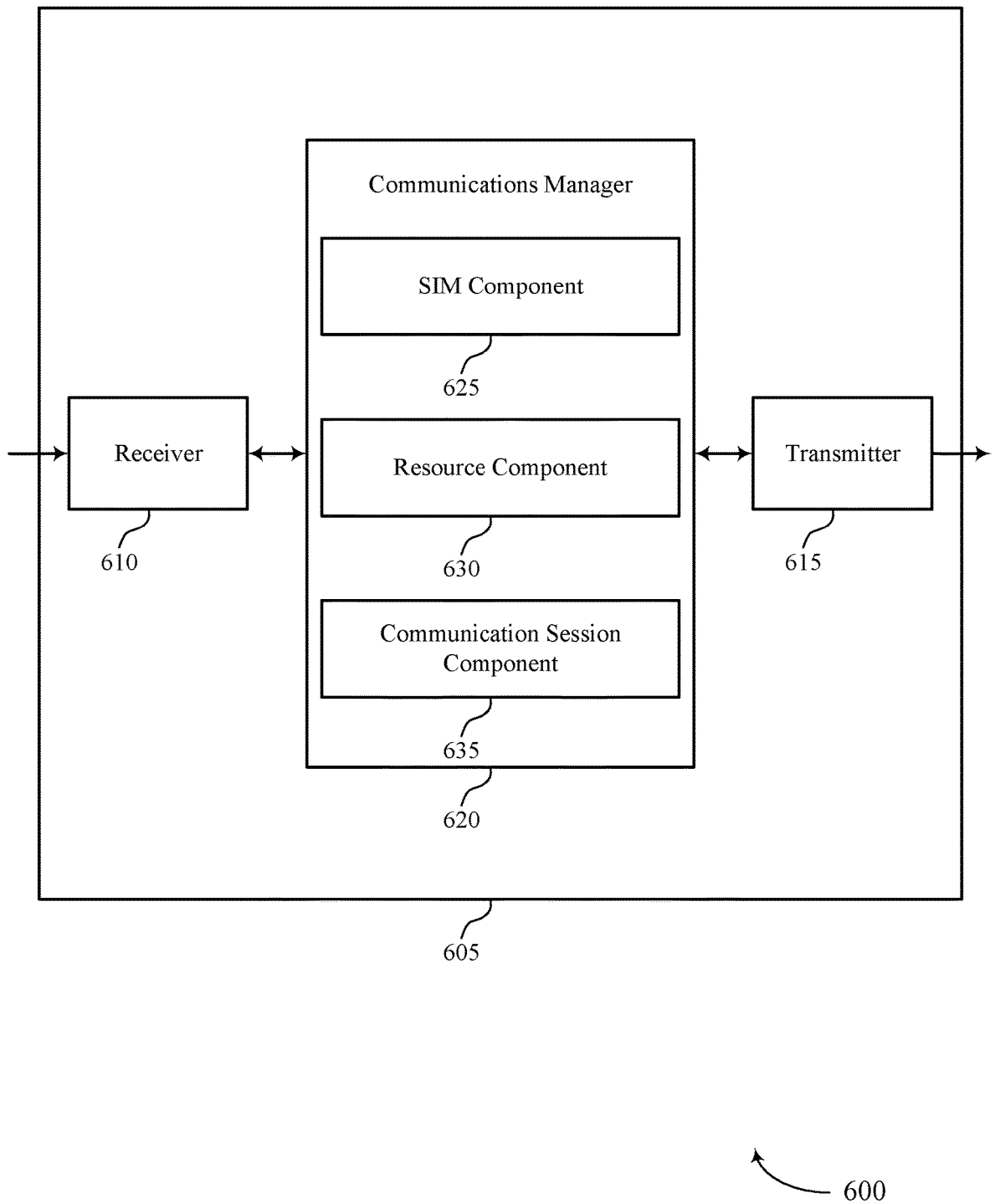

FIG. 6 shows a block diagram 600 of a device 605 that supports resource sharing during communication pause in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource sharing during communication pause). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource sharing during communication pause). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of resource sharing during communication pause as described herein. For example, the communications manager 620 may include a SIM component 625, a resource component 630, a communication session component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications in accordance with examples as disclosed herein. The SIM component 625 may be configured as or otherwise support a means for establishing a first wireless connection for a first subscriber identity module of the UE and a second wireless connection for a second subscriber identity module of the UE, the first wireless connection sharing a set of time-frequency resources with the second wireless connection. The resource component 630 may be configured as or otherwise support a means for communicating during a communication session one or more first data packets on the first wireless connection using the set of time-frequency resources. The communication session component 635 may be configured as or otherwise support a means for determining to pause, for a duration, the communication session on the first wireless connection using the set of time-frequency resources. The resource component 630 may be configured as or otherwise support a means for communicating, for at least a portion of the duration, one or more second data packets on the second wireless connection using the set of time-frequency resources based on determining to pause the communication session on the first wireless connection.

Figure 7:
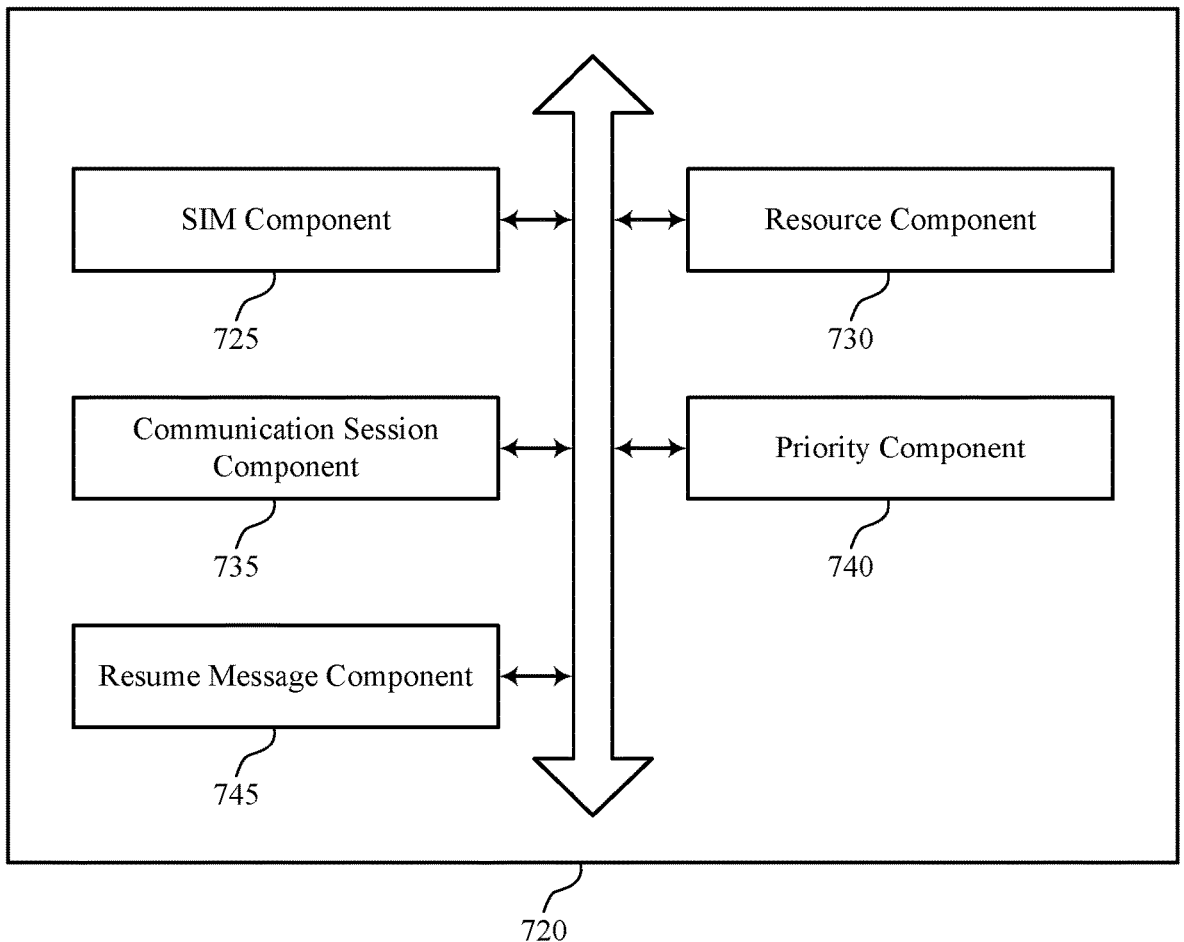
FIG. 7 shows a block diagram of a communications manager that supports resource sharing during communication pause in accordance with aspects of the present disclosure.

FIG. 7 shows a block diagram 700 of a communications manager 720 that supports resource sharing during communication pause in accordance with aspects of the present disclosure. The communications manager 720 may be an example of aspects of a communications manager 520, a communications manager 620, or both, as described herein. The communications manager 720, or various components thereof, may be an example of means for performing various aspects of resource sharing during communication pause as described herein. For example, the communications manager 720 may include a SIM component 725, a resource component 730, a communication session component 735, a priority component 740, a resume message component 745, or any combination thereof. Each of these components may communicate, directly or indirectly, with one another (e.g., via one or more buses).

The communications manager 720 may support wireless communications in accordance with examples as disclosed herein. The SIM component 725 may be configured as or otherwise support a means for establishing a first wireless connection for a first subscriber identity module of the UE and a second wireless connection for a second subscriber identity module of the UE, the first wireless connection sharing a set of time-frequency resources with the second wireless connection. The resource component 730 may be configured as or otherwise support a means for communicating during a communication session one or more first data packets on the first wireless connection using the set of time-frequency resources. The communication session component 735 may be configured as or otherwise support a means for determining to pause, for a duration, the communication session on the first wireless connection using the set of time-frequency resources. In some examples, the resource component 730 may be configured as or otherwise support a means for communicating, for at least a portion of the duration, one or more second data packets on the second wireless connection using the set of time-frequency resources based on determining to pause the communication session on the first wireless connection.

In some examples, to support determining to pause the communication session on the first wireless connection, the communication session component 735 may be configured as or otherwise support a means for receiving, from a second UE, an indication to pause the communication session, where the first wireless connection is established with the second UE.

In some examples, the resume message component 745 may be configured as or otherwise support a means for monitoring, during an on duration of a discontinuous reception cycle, for a resume message from the second UE. In some examples, the communication session component 735 may be configured as or otherwise support a means for resuming, after the duration, the communication session based on receiving the resume message.

In some examples, to support determining to pause the communication session on the first wireless connection, the communication session component 735 may be configured as or otherwise support a means for transmitting, to a second UE, an indication to pause the communication session, where the first wireless connection is established with the second UE.

In some examples, the communication session component 735 may be configured as or otherwise support a means for resuming, after the duration, the communication session on the first wireless connection using the set of time-frequency resources.

In some examples, the SIM component 725 may be configured as or otherwise support a means for monitoring, during an on duration of a discontinuous reception cycle configured for the UE, for a message from a base station, the message indicating a configuration for the communication on the first wireless connection.

In some examples, the priority component 740 may be configured as or otherwise support a means for comparing a priority of the one or more second data packets to a threshold, where monitoring for the message from the base station is based on the priority being below the threshold.

In some examples, the priority component 740 may be configured as or otherwise support a means for reducing a priority of the set of time-frequency resources for the first subscriber identity module based on determining to pause the communication session on the first wireless connection.

In some examples, the communication session component 735 may be configured as or otherwise support a means for resuming, after the duration, the communication session on the first wireless connection. In some examples, the priority component 740 may be configured as or otherwise support a means for increasing the priority of the set of time-frequency resources for the first subscriber identity module based on resuming the communication session.

In some examples, to support communicating the one or more first data packets, the communication session component 735 may be configured as or otherwise support a means for communicating a voice call with a second UE, the voice call including a voice over long term evolution call, a voice over new radio call, or a combination thereof.

In some examples, the UE is a dual-subscriber identity module dual-standby device.

Figure 8:
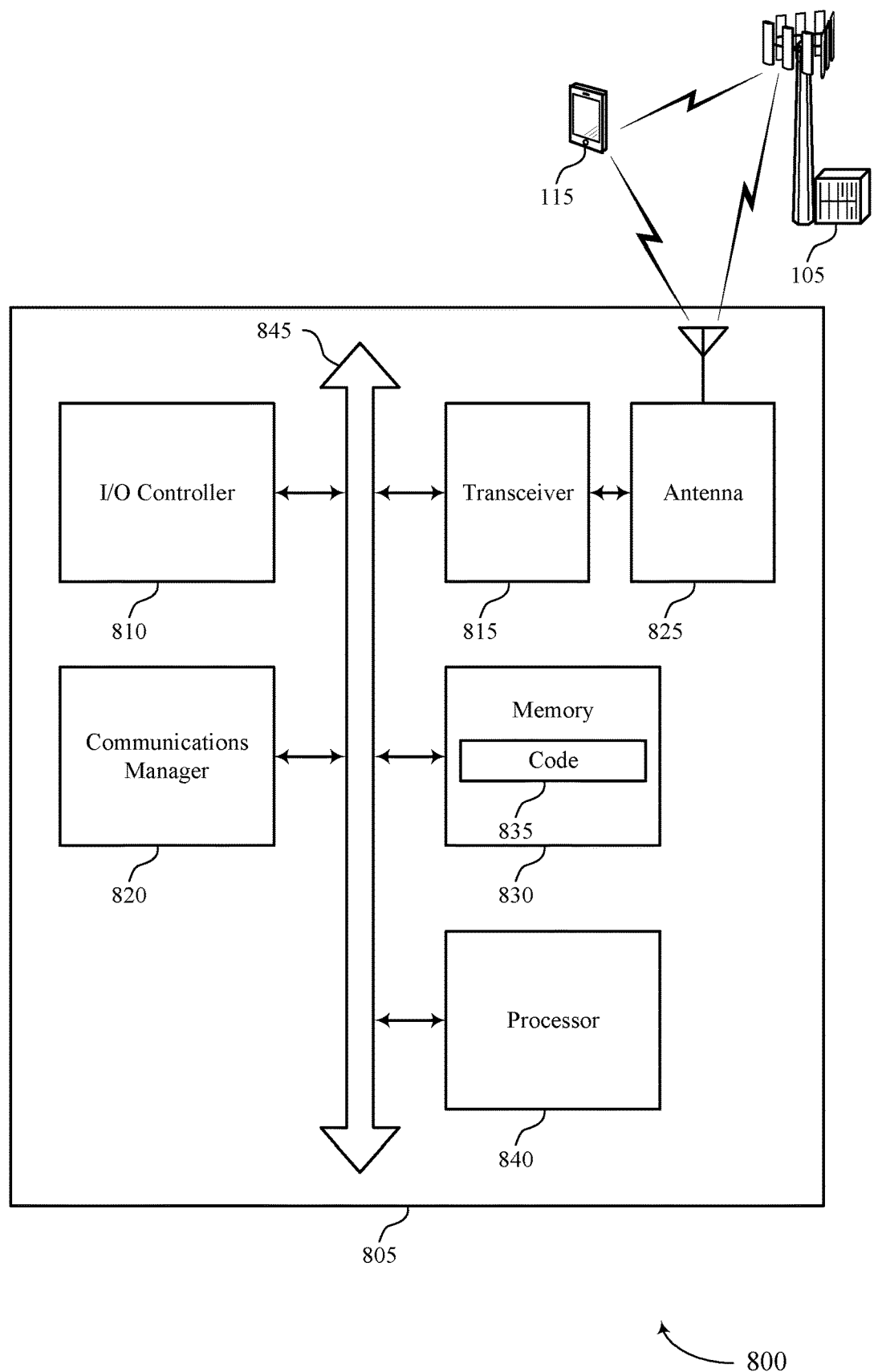
FIG. 8 shows a diagram of a system including a device that supports resource sharing during communication pause in accordance with aspects of the present disclosure.

FIG. 8 shows a diagram of a system 800 including a device 805 that supports resource sharing during communication pause in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting resource sharing during communication pause). For example, the device 805 or a component of the device 805 may include a processor 840 and memory 830 coupled to the processor 840, the processor 840 and memory 830 configured to perform various functions described herein.

The communications manager 820 may support wireless communications in accordance with examples as disclosed herein. For example, the communications manager 820 may be configured as or otherwise support a means for establishing a first wireless connection for a first subscriber identity module of the UE and a second wireless connection for a second subscriber identity module of the UE, the first wireless connection sharing a set of time-frequency resources with the second wireless connection. The communications manager 820 may be configured as or otherwise support a means for communicating during a communication session one or more first data packets on the first wireless connection using the set of time-frequency resources. The communications manager 820 may be configured as or otherwise support a means for determining to pause, for a duration, the communication session on the first wireless connection using the set of time-frequency resources. The communications manager 820 may be configured as or otherwise support a means for communicating, for at least a portion of the duration, one or more second data packets on the second wireless connection using the set of time-frequency resources based on determining to pause the communication session on the first wireless connection.

By including or configuring the communications manager 820 in accordance with examples as described herein, the device 805 may support techniques for a UE 115 to release resources during a communication pause on a subscription for a first SIM (e.g., SIM1) to use for communication on a subscription for a second SIM (e.g., SIM2) during an off duration of a DRX cycle or throughout the pause duration, which may improve communication reliability, reduce latency, improve user experience related to reduced processing, reduce power consumption, result in more efficient utilization of communication resources, improve coordination between devices, increase battery life, improve utilization of processing capability, and more.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of resource sharing during communication pause as described herein, or the processor 840 and the memory 830 may be otherwise configured to perform or support such operations.

Figure 9:
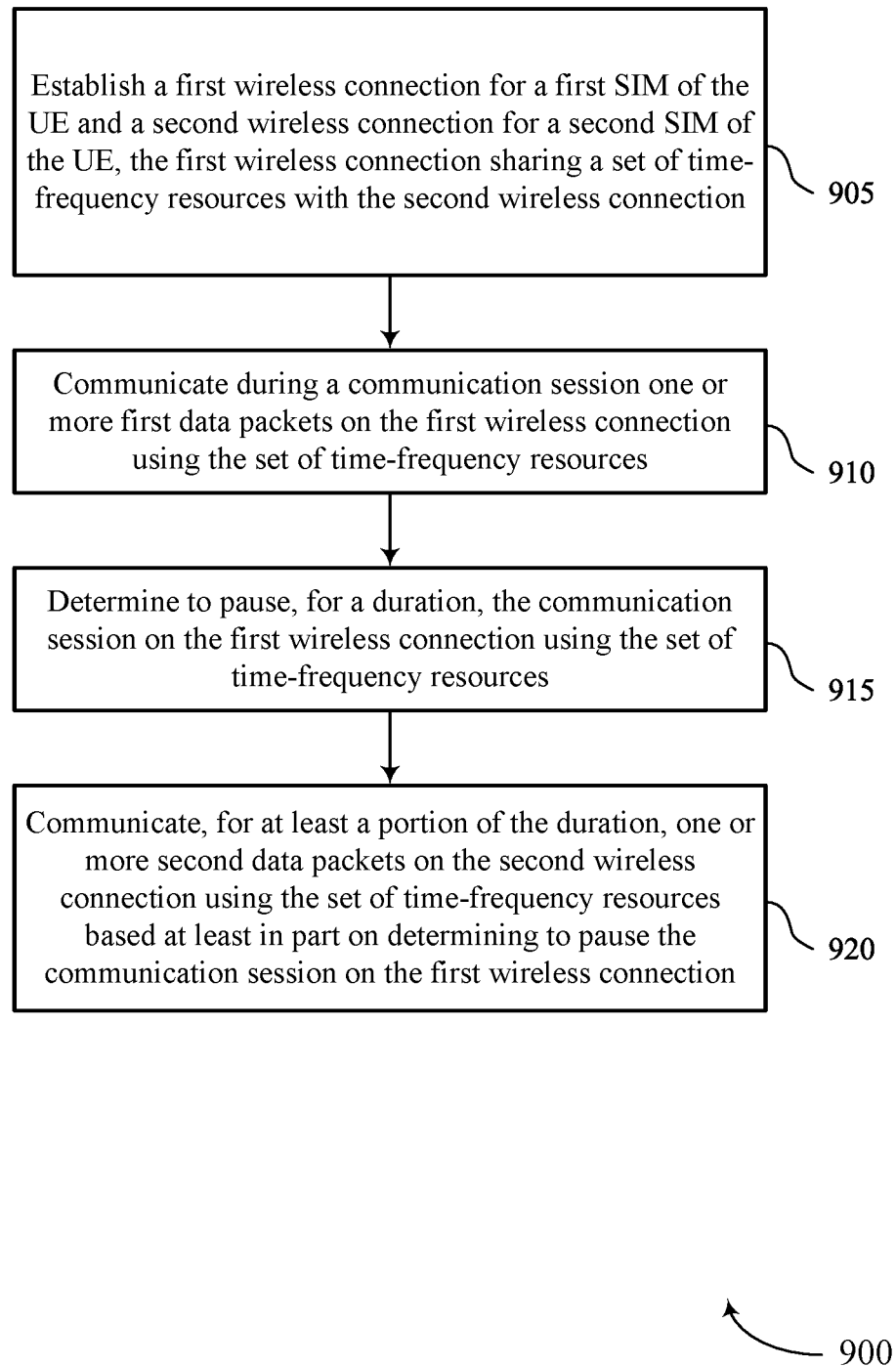
FIGS. 9 through 11 show flowcharts illustrating methods that support resource sharing during communication pause in accordance with aspects of the present disclosure.

FIG. 9 shows a flowchart illustrating a method 900 that supports resource sharing during communication pause in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include establishing a first wireless connection for a first subscriber identity module of the UE and a second wireless connection for a second subscriber identity module of the UE, the first wireless connection sharing a set of time-frequency resources with the second wireless connection. The operations of 905 may be performed in accordance with examples as disclosed herein. In some examples, aspects of the operations of 905 may be performed by a SIM component 725 as described with reference to FIG. 7.

At 910, the method may include communicating during a communication session one or more first data packets on the first wireless connection using the set of time-frequency resources. The operations of 910 may be performed in accordance with examples as disclosed herein. In some examples, aspects of the operations of 910 may be performed by a resource component 730 as described with reference to FIG. 7.

At 915, the method may include determining to pause, for a duration, the communication session on the first wireless connection using the set of time-frequency resources. The operations of 915 may be performed in accordance with examples as disclosed herein. In some examples, aspects of the operations of 915 may be performed by a communication session component 735 as described with reference to FIG. 7.

At 920, the method may include communicating, for at least a portion of the duration, one or more second data packets on the second wireless connection using the set of time-frequency resources based on determining to pause the communication session on the first wireless connection. The operations of 920 may be performed in accordance with examples as disclosed herein. In some examples, aspects of the operations of 920 may be performed by a resource component 730 as described with reference to FIG. 7.

Figure 10:
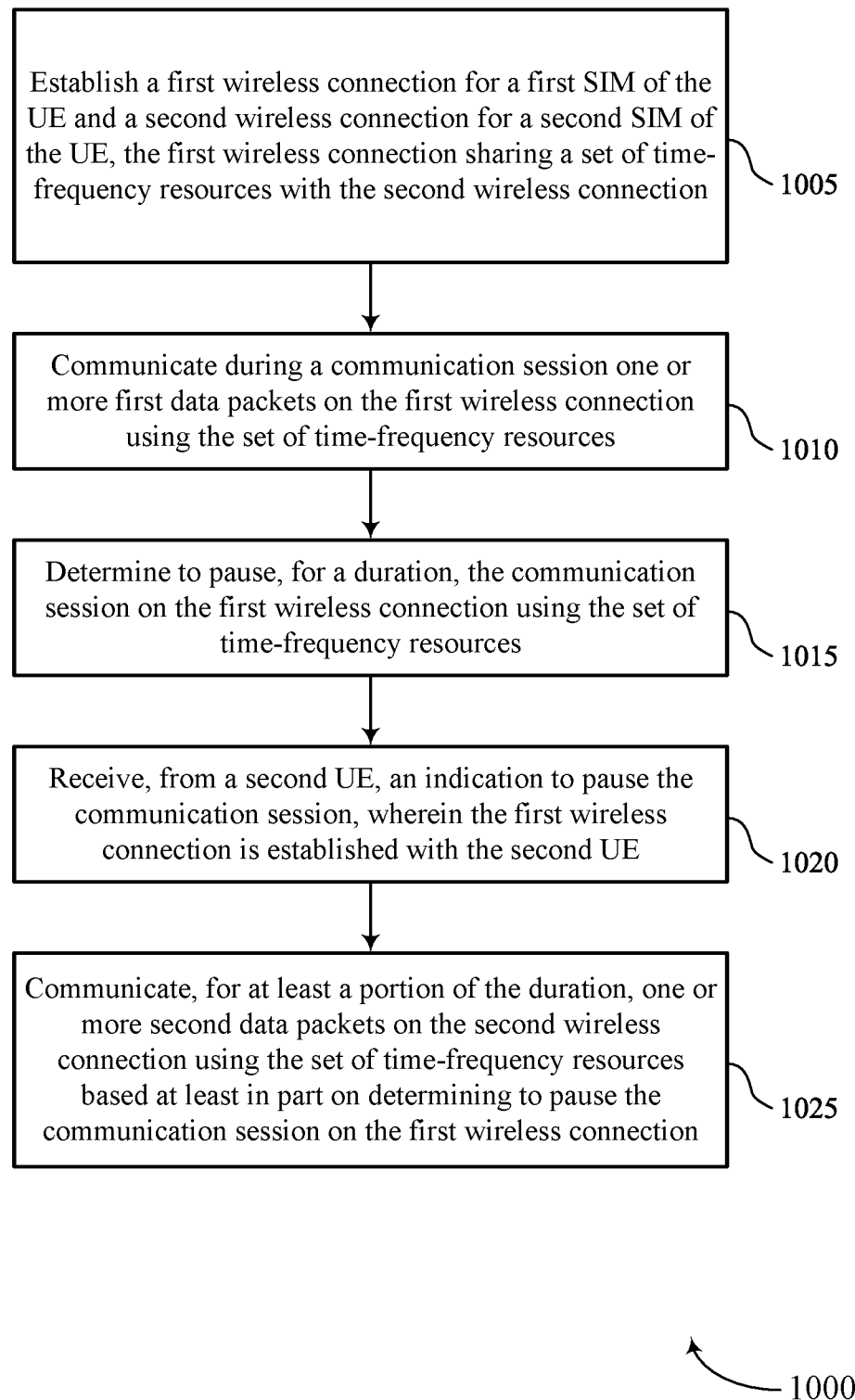

FIG. 10 shows a flowchart illustrating a method 1000 that supports resource sharing during communication pause in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include establishing a first wireless connection for a first subscriber identity module of the UE and a second wireless connection for a second subscriber identity module of the UE, the first wireless connection sharing a set of time-frequency resources with the second wireless connection. The operations of 1005 may be performed in accordance with examples as disclosed herein. In some examples, aspects of the operations of 1005 may be performed by a SIM component 725 as described with reference to FIG. 7.

At 1010, the method may include communicating during a communication session one or more first data packets on the first wireless connection using the set of time-frequency resources. The operations of 1010 may be performed in accordance with examples as disclosed herein. In some examples, aspects of the operations of 1010 may be performed by a resource component 730 as described with reference to FIG. 7.

At 1015, the method may include determining to pause, for a duration, the communication session on the first wireless connection using the set of time-frequency resources. The operations of 1015 may be performed in accordance with examples as disclosed herein. In some examples, aspects of the operations of 1015 may be performed by a communication session component 735 as described with reference to FIG. 7.

At 1020, the method may include receiving, from a second UE, an indication to pause the communication session, where the first wireless connection is established with the second UE. The operations of 1020 may be performed in accordance with examples as disclosed herein. In some examples, aspects of the operations of 1020 may be performed by a communication session component 735 as described with reference to FIG. 7.

At 1025, the method may include communicating, for at least a portion of the duration, one or more second data packets on the second wireless connection using the set of time-frequency resources based on determining to pause the communication session on the first wireless connection. The operations of 1025 may be performed in accordance with examples as disclosed herein. In some examples, aspects of the operations of 1025 may be performed by a resource component 730 as described with reference to FIG. 7.

Figure 11:
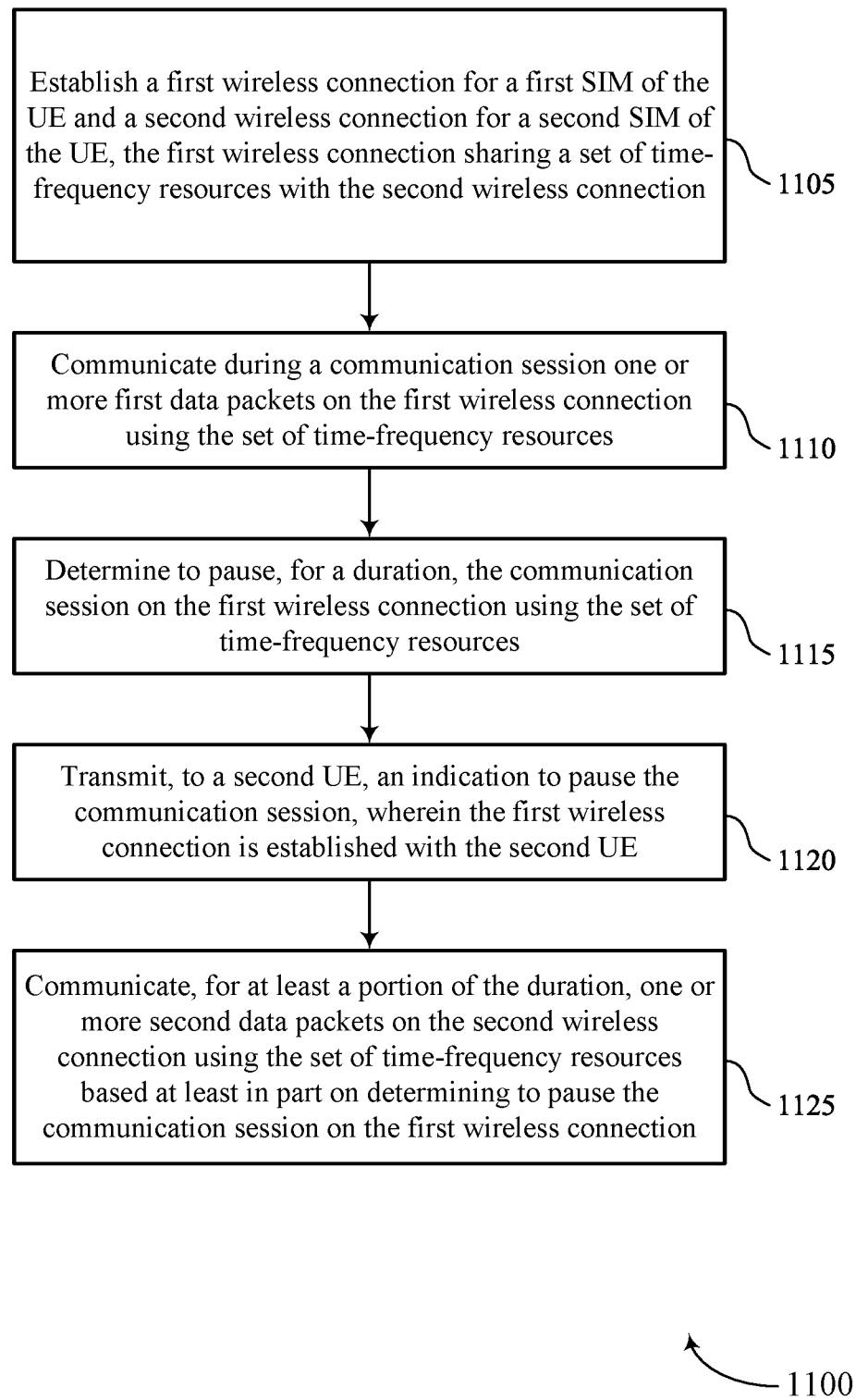

FIG. 11 shows a flowchart illustrating a method 1100 that supports resource sharing during communication pause in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include establishing a first wireless connection for a first subscriber identity module of the UE and a second wireless connection for a second subscriber identity module of the UE, the first wireless connection sharing a set of time-frequency resources with the second wireless connection. The operations of 1105 may be performed in accordance with examples as disclosed herein. In some examples, aspects of the operations of 1105 may be performed by a SIM component 725 as described with reference to FIG. 7.

At 1110, the method may include communicating during a communication session one or more first data packets on the first wireless connection using the set of time-frequency resources. The operations of 1110 may be performed in accordance with examples as disclosed herein. In some examples, aspects of the operations of 1110 may be performed by a resource component 730 as described with reference to FIG. 7.

At 1115, the method may include determining to pause, for a duration, the communication session on the first wireless connection using the set of time-frequency resources. The operations of 1115 may be performed in accordance with examples as disclosed herein. In some examples, aspects of the operations of 1115 may be performed by a communication session component 735 as described with reference to FIG. 7.

At 1120, the method may include transmitting, to a second UE, an indication to pause the communication session, where the first wireless connection is established with the second UE. The operations of 1120 may be performed in accordance with examples as disclosed herein. In some examples, aspects of the operations of 1120 may be performed by a communication session component 735 as described with reference to FIG. 7.

At 1125, the method may include communicating, for at least a portion of the duration, one or more second data packets on the second wireless connection using the set of time-frequency resources based on determining to pause the communication session on the first wireless connection. The operations of 1125 may be performed in accordance with examples as disclosed herein. In some examples, aspects of the operations of 1125 may be performed by a resource component 730 as described with reference to FIG. 7.

The following provides an overview of aspects of the present disclosure:

Aspect 1: A method for wireless communications, at a UE comprising: establishing a first wireless connection for a first subscriber identity module of the UE and a second wireless connection for a second subscriber identity module of the UE, the first wireless connection sharing a set of time-frequency resources with the second wireless connection; communicating during a communication session one or more first data packets on the first wireless connection using the set of time-frequency resources; determining to pause, for a duration, the communication session on the first wireless connection using the set of time-frequency resources; and communicating, for at least a portion of the duration, one or more second data packets on the second wireless connection using the set of time-frequency resources based at least in part on determining to pause the communication session on the first wireless connection.

Aspect 2: The method of aspect 1, wherein determining to pause the communication session on the first wireless connection comprises: receiving, from a second UE, an indication to pause the communication session, wherein the first wireless connection is established with the second UE.

Aspect 3: The method of aspect 2, further comprising: monitoring, during an on duration of a discontinuous reception cycle, for a resume message from the second UE; and resuming, after the duration, the communication session based at least in part on receiving the resume message.

Aspect 4: The method of aspect 1, wherein determining to pause the communication session on the first wireless connection comprises: transmitting, to a second UE, an indication to pause the communication session, wherein the first wireless connection is established with the second UE.

Aspect 5: The method of aspect 4, further comprising: resuming, after the duration, the communication session on the first wireless connection using the set of time-frequency resources.

Aspect 6: The method of any of aspects 4 through 5, further comprising: monitoring, during an on duration of a discontinuous reception cycle configured for the UE, for a message from a base station, the message indicating a configuration for the communication on the first wireless connection.

Aspect 7: The method of aspect 6, further comprising: comparing a priority of the one or more second data packets to a threshold, wherein monitoring for the message from the base station is based at least in part on the priority being below the threshold.

Aspect 8: The method of any of aspects 1 through 7, further comprising: reducing a priority of the set of time-frequency resources for the first subscriber identity module based at least in part on determining to pause the communication session on the first wireless connection.

Aspect 9: The method of aspect 8, further comprising: resuming, after the duration, the communication session on the first wireless connection; and increasing the priority of the set of time-frequency resources for the first subscriber identity module based at least in part on resuming the communication session.

Aspect 10: The method of any of aspects 1 through 9, wherein communicating the one or more first data packets comprises: communicating a voice call with a second UE, the voice call comprising a voice over long term evolution call, a voice over new radio call, or a combination thereof.

Aspect 11: The method of any of aspects 1 through 10, wherein the UE is a dual-subscriber identity module dual-standby device.

Aspect 12: An apparatus for wireless communications, comprising a processor; memory coupled with the processor; and instructions stored in the memory and executable by the processor to cause the apparatus to perform a method of any of aspects 1 through 11.

Aspect 13: An apparatus for wireless communications, comprising at least one means for performing a method of any of aspects 1 through 11.

Aspect 14: A non-transitory computer-readable medium storing code for wireless communications, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, at a user equipment (UE) comprising:
   establishing a first wireless connection for a first subscriber identity module of the UE and a second wireless connection for a second subscriber identity module of the UE, the first wireless connection for the first subscriber identity module sharing a set of time-frequency resources with the second wireless connection for the second subscriber identity module;
   communicating during a communication session one or more first data packets on the first wireless connection for the first subscriber identity module using the set of time-frequency resources;
   receiving, from a second UE, an indication to pause the communication session, wherein the first wireless connection is established with the second UE;
   determining to pause based at least in part on the indication, for a duration comprising at least a portion of an off duration of a discontinuous reception cycle associated with the UE, the communication session on the first wireless connection for the first subscriber identity module using the set of time-frequency resources; and
   communicating, for at least a portion of the duration, one or more second data packets on the second wireless connection for the second subscriber identity module using the set of time-frequency resources based at least in part on determining to pause the communication session on the first wireless connection for the first subscriber identity module.

2. The method of claim 1, further comprising:
   monitoring, during an on duration of a discontinuous reception cycle, for a resume message from the second UE; and
   resuming, after the duration, the communication session based at least in part on receiving the resume message.

3. The method of claim 1, wherein determining to pause the communication session on the first wireless connection comprises:
   transmitting, to a second UE, an indication to pause the communication session, wherein the first wireless connection is established with the second UE.

4. The method of claim 3, further comprising:
   resuming, after the duration, the communication session on the first wireless connection using the set of time-frequency resources.

5. The method of claim 3, further comprising:
   monitoring, during an on duration of a discontinuous reception cycle configured for the UE, for a message from a network entity, the message indicating a configuration for the communication session on the first wireless connection.

6. The method of claim 5, further comprising:
   comparing a priority of the one or more second data packets to a threshold, wherein monitoring for the message from the network entity is based at least in part on the priority being below the threshold.

7. The method of claim 1, further comprising:
   reducing a priority of the set of time-frequency resources for the first subscriber identity module based at least in part on determining to pause the communication session on the first wireless connection.

8. The method of claim 7, further comprising:
   resuming, after the duration, the communication session on the first wireless connection; and
   increasing the priority of the set of time-frequency resources for the first subscriber identity module based at least in part on resuming the communication session.

9. The method of claim 1, wherein communicating the one or more first data packets comprises:
   communicating a voice call with a second UE, the voice call comprising a voice over long term evolution call, a voice over new radio call, or a combination thereof.

10. The method of claim 1, wherein the UE is a dual-subscriber identity module dual-standby device.

11. An apparatus for wireless communications, comprising:
   one or more processors;
   memory coupled with the one or more processors; and
   instructions stored in the memory and executable by the one or more processors to cause the apparatus to:
      establish a first wireless connection for a first subscriber identity module of a user equipment (UE) and a second wireless connection for a second subscriber identity module of the UE, the first wireless connection for the first subscriber identity module sharing a set of time-frequency resources with the second wireless connection for the second subscriber identity module;
      communicate during a communication session one or more first data packets on the first wireless connection for the first subscriber identity module using the set of time-frequency resources;
      receive, from a second UE, an indication to pause the communication session, wherein the first wireless connection is established with the second UE;
      determine to pause based at least in part on the indication, for a duration comprising at least a portion of an off duration of a discontinuous reception cycle associated with the UE, the communication session on the first wireless connection for the first subscriber identity module using the set of time-frequency resources; and
      communicate, for at least a portion of the duration, one or more second data packets on the second wireless connection for the second subscriber identity module using the set of time-frequency resources based at least in part on determining to pause the communication session on the first wireless connection for the first subscriber identity module.

12. The apparatus of claim 11, wherein the instructions are further executable by the one or more processors to cause the apparatus to:
monitor, during an on duration of a discontinuous reception cycle, for a resume message from the second UE; and
resume, after the duration, the communication session based at least in part on receiving the resume message.

13. The apparatus of claim 11, wherein the instructions to determine to pause the communication session on the first wireless connection are executable by the one or more processors to cause the apparatus to:
transmit, to a second UE, an indication to pause the communication session, wherein the first wireless connection is established with the second UE.

14. The apparatus of claim 13, wherein the instructions are further executable by the one or more processors to cause the apparatus to:
resume, after the duration, the communication session on the first wireless connection using the set of time-frequency resources.

15. The apparatus of claim 13, wherein the instructions are further executable by the one or more processors to cause the apparatus to:
monitor, during an on duration of a discontinuous reception cycle configured for the UE, for a message from a network entity, the message indicating a configuration for the communication session on the first wireless connection.

16. The apparatus of claim 15, wherein the instructions are further executable by the one or more processors to cause the apparatus to:
compare a priority of the one or more second data packets to a threshold, wherein monitoring for the message from the network entity is based at least in part on the priority being below the threshold.

17. The apparatus of claim 11, wherein the instructions are further executable by the one or more processors to cause the apparatus to:
reduce a priority of the set of time-frequency resources for the first subscriber identity module based at least in part on determining to pause the communication session on the first wireless connection.

18. The apparatus of claim 17, wherein the instructions are further executable by the one or more processors to cause the apparatus to:
resume, after the duration, the communication session on the first wireless connection; and
increase the priority of the set of time-frequency resources for the first subscriber identity module based at least in part on resuming the communication session.

19. The apparatus of claim 11, wherein the instructions to communicate the one or more first data packets are executable by the one or more processors to cause the apparatus to:
communicate a voice call with a second UE, the voice call comprising a voice over long term evolution call, a voice over new radio call, or a combination thereof.

20. The apparatus of claim 11, wherein the UE is a dual-subscriber identity module dual-standby device.

21. An apparatus for wireless communications, comprising:
means for establishing a first wireless connection for a first subscriber identity module of a user equipment (UE) and a second wireless connection for a second subscriber identity module of the UE, the first wireless connection for the first subscriber identity module sharing a set of time-frequency resources with the second wireless connection for the second subscriber identity module;
means for communicating during a communication session one or more first data packets on the first wireless connection for the first subscriber identity module using the set of time-frequency resources;
means for receiving, from a second UE, an indication to pause the communication session, wherein the first wireless connection is established with the second UE;
means for determining to pause based at least in part on the indication, for a duration comprising at least a portion of an off duration of a discontinuous reception cycle associated with the UE, the communication session on the first wireless connection for the first subscriber identity module using the set of time-frequency resources; and
means for communicating, for at least a portion of the duration, one or more second data packets on the second wireless connection for the second subscriber identity module using the set of time-frequency resources based at least in part on determining to pause the communication session on the first wireless connection for the first subscriber identity module.

22. The apparatus of claim 21, further comprising:
means for monitoring, during an on duration of a discontinuous reception cycle, for a resume message from the second UE; and
means for resuming, after the duration, the communication session based at least in part on receiving the resume message.

23. The apparatus of claim 21, wherein the means for determining to pause the communication session on the first wireless connection comprise:
means for transmitting, to a second UE, an indication to pause the communication session, wherein the first wireless connection is established with the second UE.

24. The apparatus of claim 23, further comprising:
means for resuming, after the duration, the communication session on the first wireless connection using the set of time-frequency resources.

25. The apparatus of claim 23, further comprising:
means for monitoring, during an on duration of a discontinuous reception cycle configured for the UE, for a message from a network entity, the message indicating a configuration for the communication session on the first wireless connection.

26. The apparatus of claim 21, further comprising:
means for reducing a priority of the set of time-frequency resources for the first subscriber identity module based at least in part on determining to pause the communication session on the first wireless connection.

27. A non-transitory computer-readable medium storing code for wireless communications, the code comprising instructions executable by one or more processors to:
establish a first wireless connection for a first subscriber identity module of a user equipment (UE) and a second wireless connection for a second subscriber identity module of the UE, the first wireless connection for the first subscriber identity module sharing a set of time-frequency resources with the second wireless connection for the second subscriber identity module;

communicate during a communication session one or more first data packets on the first wireless connection for the first subscriber identity module using the set of time-frequency resources;

receive, from a second UE, an indication to pause the communication session, wherein the first wireless connection is established with the second UE;

determine to pause based at least in part on the indication, for a duration comprising at least a portion of an off duration of a discontinuous reception cycle associated with the UE, the communication session on the first wireless connection for the first subscriber identity module using the set of time-frequency resources; and communicate, for at least a portion of the duration, one or more second data packets on the second wireless connection for the second subscriber identity module using the set of time-frequency resources based at least in part on determining to pause the communication session on the first wireless connection for the first subscriber identity module.

* * * * *